US012273495B2

(12) United States Patent
Williams et al.

(10) Patent No.: US 12,273,495 B2
(45) Date of Patent: *Apr. 8, 2025

(54) INTERACTIVE THREE-DIMENSIONAL (3D) COLOR HISTOGRAMS

(71) Applicant: Fiery, LLC, Fremont, CA (US)

(72) Inventors: Leon Williams, Walworth, NY (US); Thor Olson, Eagan, MN (US)

(73) Assignee: FIERY, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,475

(22) Filed: Mar. 15, 2023

(65) Prior Publication Data

US 2023/0254435 A1 Aug. 10, 2023

Related U.S. Application Data

(60) Division of application No. 17/550,088, filed on Dec. 14, 2021, which is a continuation of application No.

(Continued)

(51) Int. Cl.
*G03F 3/08* (2006.01)
*G06T 7/90* (2017.01)
(Continued)

(52) U.S. Cl.
CPC ............... *H04N 1/60* (2013.01); *G06T 7/90* (2017.01); *G06T 15/04* (2013.01); *G06T 15/50* (2013.01);
(Continued)

(58) Field of Classification Search
CPC .. H04N 1/60; H04N 1/00023; H04N 1/00047; H04N 1/6011; H04N 1/6061;
(Continued)

(56) References Cited

U.S. PATENT DOCUMENTS 5,517,334 A   5/1996 Morag et al.
7,751,620 B1 * 7/2010 Cosoi ................... H04L 51/212
                                                    382/168
(Continued)

FOREIGN PATENT DOCUMENTS

WO   WO-9858493 A1 * 12/1998 ........... H04N 1/6058

OTHER PUBLICATIONS

Barthel, Kai Uwe, "3D Color Inspector/Color Histogram", XP055652368, Retrieved from the Internet: URL:https://web.archive.org/web/20151230113417/https://imagej.nih.gov/ij/plugins/color-inspector.html [retrieved on Dec. 12, 2019]* the whole document, Dec. 30, 2015.

(Continued)

*Primary Examiner* — Huo Long Chen
(74) *Attorney, Agent, or Firm* — Perkins Coie LLP

(57) ABSTRACT

Techniques for interactively determining/visualizing the color content of a source image and how the corresponding image data is mapped to device colors are described herein. For example, the color content of a digital image can be converted between different color spaces to identify gamut limitations of an output device (e.g., a printing assembly), discover color(s) that cannot be accurately reproduced, etc. Color space conversions enable the transformation of the color content of the digital image from device-specific colorants to a device-independent representation (and vice versa). In some embodiments, these transformations are facilitated using lookup tables that are implemented in graphical processing unit-resident memory.

13 Claims, 57 Drawing Sheets

Related U.S. Application Data

16/600,962, filed on Oct. 14, 2019, now Pat. No. 11,212,421, which is a continuation of application No. 15/605,770, filed on May 25, 2017, now Pat. No. 10,447,896.

(60) Provisional application No. 62/343,065, filed on May 30, 2016, provisional application No. 62/342,857, filed on May 27, 2016.

(51) Int. Cl.
| | |
|---|---|
| *G06T 15/04* | (2011.01) |
| *G06T 15/50* | (2011.01) |
| *G06V 10/56* | (2022.01) |
| *G06V 10/75* | (2022.01) |
| *H04N 1/00* | (2006.01) |
| *H04N 1/60* | (2006.01) |

(52) U.S. Cl.
CPC ............ *G06T 15/503* (2013.01); *G06V 10/56* (2022.01); *G06V 10/758* (2022.01); *H04N 1/00023* (2013.01); *H04N 1/00047* (2013.01); *H04N 1/6011* (2013.01); *H04N 1/6061* (2013.01); *H04N 1/6066* (2013.01); *G06T 2200/24* (2013.01); *G06T 2207/10024* (2013.01); *G06T 2207/20021* (2013.01); *G06T 2207/20072* (2013.01); *H04N 1/603* (2013.01)

(58) Field of Classification Search
CPC ........ H04N 1/6066; H04N 1/603; G06T 7/90; G06T 15/04; G06T 15/50; G06T 15/503; G06T 2200/24; G06T 2207/10024; G06T 2207/20021; G06T 2207/20072; G06V 10/56; G06V 10/758
See application file for complete search history.

(56) References Cited

U.S. PATENT DOCUMENTS

| | | | | |
|---|---|---|---|---|
| 10,447,896 | B2 * | 10/2019 | Williams | ........... H04N 1/00047 |
| 11,212,421 | B2 * | 12/2021 | Williams | ........... H04N 1/00023 |
| 2002/0063719 | A1 | 5/2002 | Ziobro et al. | |
| 2002/0145744 | A1 * | 10/2002 | Kumada | ................. H04N 1/603 |
| | | | | 358/1.9 |
| 2003/0185457 | A1 | 10/2003 | Campbell | |
| 2004/0036896 | A1 * | 2/2004 | Yamauchi | .............. H04N 1/295 |
| | | | | 358/1.9 |
| 2004/0070626 | A1 | 4/2004 | Matsumoto | |
| 2007/0127814 | A1 | 6/2007 | Fluck et al. | |
| 2007/0247475 | A1 | 10/2007 | Pettigrew et al. | |
| 2009/0122325 | A1 * | 5/2009 | Farrell | ................. H04N 1/6058 |
| | | | | 358/1.9 |
| 2010/0094800 | A1 | 4/2010 | Sharp et al. | |
| 2011/0316851 | A1 | 12/2011 | Pettigrew et al. | |
| 2012/0090488 | A1 * | 4/2012 | Postle | ...................... H04N 1/54 |
| | | | | 101/483 |
| 2012/0093399 | A1 | 4/2012 | Paik et al. | |
| 2013/0019196 | A1 | 1/2013 | Bhatt | |
| 2013/0229414 | A1 | 9/2013 | Gruber et al. | |
| 2013/0301953 | A1 | 11/2013 | Montague et al. | |
| 2014/0028696 | A1 | 1/2014 | Kulkarni | |
| 2016/0034795 | A1 | 2/2016 | Klammer et al. | |
| 2016/0247305 | A1 | 8/2016 | Borg et al. | |

OTHER PUBLICATIONS

Barthel, Kai Uwe, "Color Inspector 3D", XP055652583, Retrieved from the Internet: URL:http://home.htw-berlin.de/-barthel/ImageJ/Colorinspector/help.htm [retrieved on Dec. 13, 2019]* the whole document, Sep. 19, 2005.

Colantoni, Philippe , "ColorSpace—User manual Version 1.00", XP055652620, Retrieved from the Internet: URL:http://docshare01.docshare.tips/files/14202/142023262.pdf [retrieved on Dec. 13, 2019], Dec. 31, 2004, pp. 4,6,7.

Deuerling-Zheng, Yu , et al., "Motion compensation in digital subtraction angiography using graphics hardware", Computerized Medical Imaging and Graphics, Pergamon Press, NY, NY, US, vol. 30, No. 5, XP024903657, ISSN: 0895-6111, DOI: 10.1016/J.COMPMEDIMAG.2006.05.008 [retrieved on Jul. 1, 2006], Jul. 1, 2006, pp. 279-289.

Kubias, Alexander , et al., "Efficient computation of histograms on the GPU", Computer Graphics, ACM, 2 Penn Plaza, Suite 701, NY, NY 10121-0701 USA, XP058229879, DOI: 10.1145/2614348.2614377, ISBN: 978-1-60558-956-5, Apr. 26, 2007, pp. 207-212.

* cited by examiner

300

301
Acquire a source image in a Red Green Blue (RGB) color space

302
Transform the RGB color space into a Lab color space to produce a transformed image

303
Bin a range of color values in the transformed image

304
Quantize the bins so that similar color values are aggregated into a single bin

305
Create a 3D histogram that represents color distribution across the transformed image

401 Acquire a first image in a Red Green Blue (RGB) color space

402 Transform the RGB color space into a Lab color space to produce a second image

403 Transform the Lab color space into a printer-specific color space to produce a third image

404 Transform the printer-specific color space into the Lab color space to produce a fourth image

405 Bin a range of color values in the fourth image

406 Quantize the bins so that similar color values are aggregated into a single bin

407 Create a 3D histogram that represents color distribution across the fourth image

FIGURE 4

INTERACTIVE THREE-DIMENSIONAL (3D) COLOR HISTOGRAMS

CROSS-REFERENCE TO RELATED APPLICATIONS

This application is a division of U.S. patent application Ser. No. 17/550,088, titled "Interactive Three-Dimensional (3D) Color Histograms" and filed on Dec. 14, 2021, which is a continuation of U.S. patent application Ser. No. 16/600,962, titled "Interactive Three-Dimensional (3D) Color Histograms" and filed on Oct. 14, 2019, which issued as U.S. Pat. No. 11,212,421, which is a continuation of U.S. patent application Ser. No. 15/605,770, titled "Interactive Three-Dimensional (3D) Color Histograms" and filed on May 25, 2017, which issued as U.S. Pat. No. 10,447,896, which claims priority to U.S. Provisional Patent Application No. 62/342,857, titled "Interactive 3D Color Histograms" and filed on May 27, 2016, and U.S. Provisional Patent Application No. 62/343,065, titled "Interactive 3D Color Histograms" and filed on May 30, 2016, each of which is incorporated by reference herein in its entirety.

RELATED FIELD

Various embodiments relate to histograms that graphically represent tonal distribution in digital images and, more specifically, interactive three-dimensional (3D) histograms.

BACKGROUND

Histograms act as graphical representations of the tonal distribution in digital images. Each histogram plots the number of pixels for each tonal value. Therefore, by looking at the histogram corresponding to a specific digital image, an individual can readily examine the entire tonal distribution at a glance.

Generally, the horizontal axis of a histogram represents the tonal variations, while the vertical axis represents the number of pixels in that particular tone. For example, the left side of the horizontal axis typically corresponds to darker tones (e.g., black), the middle of the horizontal axis typically corresponds to moderate tones (e.g., medium grey), and the right side of the horizontal axis typically corresponds to lighter tones (e.g., white) for monochromatic images (also referred to as "grayscale images"). Thus, a dark image will have the majority of its data points represented on the left side and center of its histogram. Conversely, a bright image will have the majority of its data points represented on the right side and center of its histogram.

Color histograms, meanwhile, represent the distribution of colors in a digital image. More specifically, color images can represent the number of pixels that have colors in each of a fixed list of color ranges that span the digital image's color space (i.e., the set of all possible colors). Although color histograms are often used for three-dimensional (3D) color spaces (e.g., RGB or HSV), color histograms can be built for any kind of color space. However, color histograms are often difficult to manage, particularly when the set of possible color values is large.

SUMMARY

Techniques for interactively determining/visualizing the color content of a source image and how the corresponding image data is mapped to device colors are described herein. For example, the color content of a digital image can be converted between different color spaces to identify gamut limitations of an output device (e.g., a printing assembly), discover color(s) that cannot be accurately reproduced, etc.

Color space conversions enable the transformation of the color content of the digital image from device-specific colorants to a device-independent representation (and vice versa). In some embodiments, these transformations are facilitated using known International Color Consortium (ICC) profiles (i.e., sets of data that characterize a color input, output device, or color space according to standards promulgated by the ICC).

For example, to visualize the color content of a digital image, a processing system can acquire a digital image having color content in an RGB color space, transform the RGB color space into a Lab color space to produce a transformed image from the digital image, bin the range of color values in the transformed image, and create an interactive three-dimensional (3D) histogram that represents distribution of the range of color values across the transformed image.

As another example, to visualize the color content resulting from printing a digital image, a processing system can acquire a digital image having color content in an RGB color space, transform the RGB color space into a Lab color space to produce a second image from the digital image, transform the Lab color space into a printer-specific color space to produce a third image from the second image, transform the printer-specific color space back to the Lab color space to produce a fourth image from the third image, bin the range of color values in the fourth image, and create an interactive 3D histogram that represents distribution of the range of color values across the fourth image. Such a technique enables the processing device to discover colors in the digital image that cannot be accurately represented by an output device associated with the printer-specific color space.

BRIEF DESCRIPTION OF THE DRAWINGS

One or more embodiments of the present disclosure are illustrated by way of example and not limitation in the figures of the accompanying drawings, in which like references indicate similar elements.

FIG. 3 is a flow diagram of a process for visualizing the color content of a digital image.

FIG. 4 is a flow diagram of a process for visualizing the color content resulting from printing a digital image.

DETAILED DESCRIPTION

Figure 1:
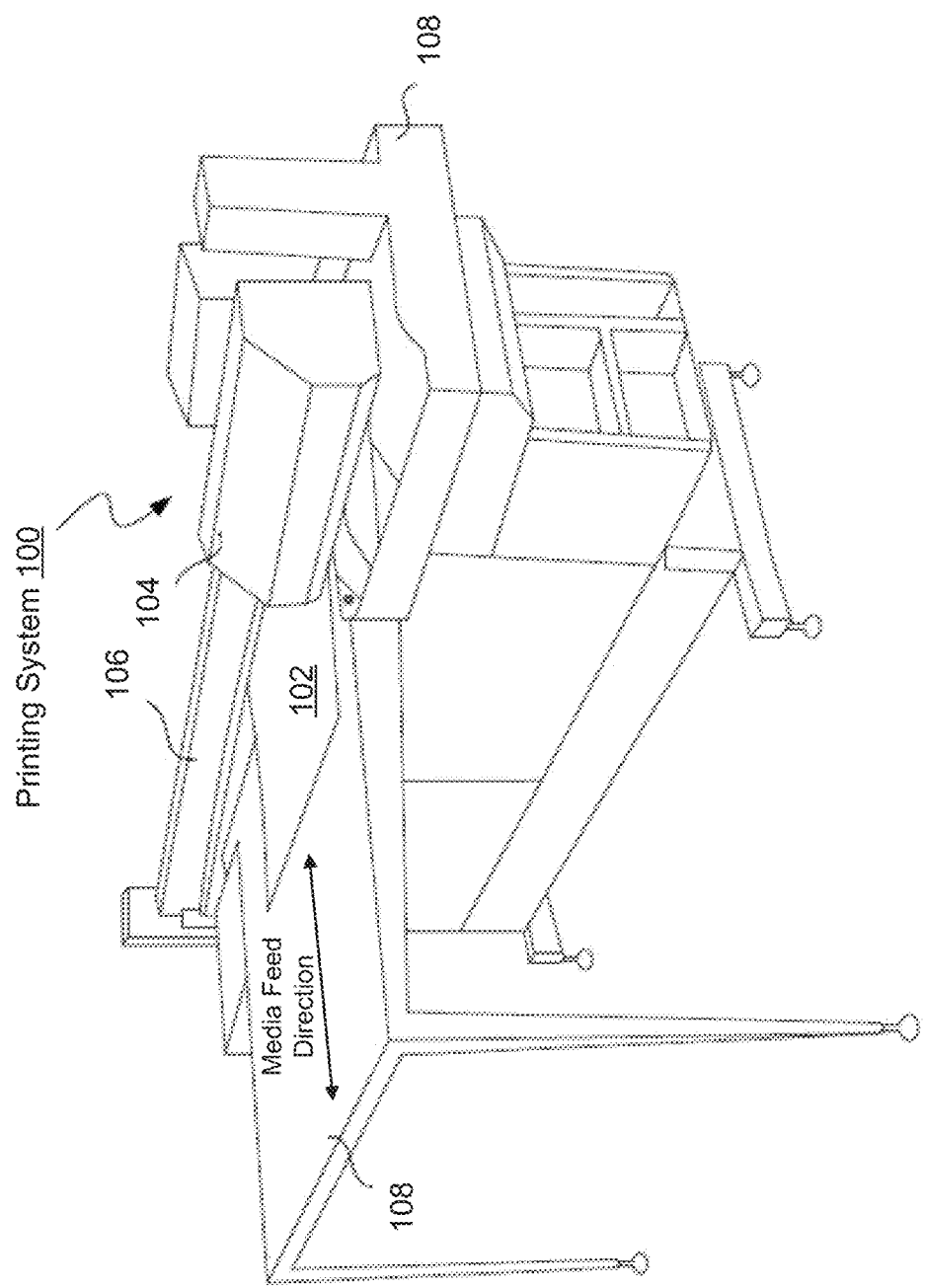
FIG. 1 depicts a printing system (also referred to as an "output device") that can deposit ink on a substrate to form image(s).

When preparing and executing color printing on a variety of different media, it is critical to understand the color content of the original data (i.e., the source image), as well as how those color(s) will be reproduced by the output device. Several different criteria affect what color(s) can be reproduced, including the media type (also referred to as a "substrate"), the ink configuration (e.g., HiFi ink configurations and other ink configurations having multiple colors), etc.

Introduced here, therefore, are techniques for interactively determining/visualizing the color content of a source image and how the corresponding image data is mapped to device colors. The term "device colors" refers to the colors capable of being created by a printer assembly.

Color space conversions enable the transformation of the color content of a source image from device-specific colorants to a device-independent representation. In some embodiments, these transformations are facilitated using known International Color Consortium (ICC) profiles (i.e., sets of data that characterize a color input, output device, or color space according to standards promulgated by the ICC).

To visualize the color content of a source image, a processing system can employ the following steps:
  Acquire a source image having color content in an RGB color space;
  Transform the RGB color space into a Lab color space to produce a transformed image from the source image;
  Bin the range of color values in the transformed image; and
  Create an interactive three-dimensional (3D) histogram that represents distribution of the range of color values across the transformed image.

The RGB color space may be a standard RGB (sRGB) color space or an Adobe RGB color space, and the Lab color space may be a Hunter 1948 color space or a CIEL*a*b 1976 color space.

Moreover, to visualize the color content resulting from printing a source image, a processing system can employ the following steps:
  Acquire a source image having color content in an RGB color space;
  Transform the RGB color space into a Lab color space to produce a second image from the source image;
  Transform the Lab color space into a printer-specific color space to produce a third image from the second image;
  Transform the printer-specific color space back to the Lab color space to produce a fourth image from the third image;
  Bin the range of color values in the fourth image; and
  Create an interactive three-dimensional (3D) histogram that represents distribution of the range of color values across the fourth image.

Accordingly, such a technique causes the color content of the source image to be transformed from the source color space to a device-independent color space to a printer-specific color space to the device-independent color space. Transforming the device-independent color space to the printer-specific color space and then back to the device-independent color space allows the processing device to identify any gamut limitations of the output device. Said another way, the processing device can discover colors in the source image that cannot be accurately represented by the output device.

Terminology

Brief definitions of terms, abbreviations, and phrases used throughout the application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that the devices do not share a physical connection with one another.

Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to the various embodiments given in this specification.

System Overview

FIG. 1 depicts a printing system 100 (also referred to as an "output device") that can deposit ink on a substrate 102 to form image(s). Here, the printing system 100 includes a carriage 104, a rail 106, and a base 108. The carriage 104 houses one or more print heads that are responsible for ejecting ink onto the substrate 102 (e.g., glass, plastic, paper composites, or combinations thereof), thereby protecting the print head(s) from damage. The carriage 104 may also serve other benefits, including limiting the release of heat/radiation generated by any curing assemblies that are housed within the carriage 104.

The carriage 104 can be coupled to rail 106, which allows the carriage 104 to pass over the substrate 102 that is designated for printing. Embodiments of the printing system 100 can include pulleys, motors, and/or any combination of mechanical/electrical technologies that enable the carriage 104 to travel along the rail 106. As the print head(s) deposit ink on the substrate 102, the substrate 102 may be moved in the media feed direction as designated in FIG. 1. Alternatively, the carriage 104 may be fixedly attached to the rail 106 or the base 108. In such embodiments, the substrate 102 can be moved in relation to the carriage 104 so that the print head(s) are able to deposit ink on the substrate 102.

Those skilled in the art will recognize that the printing system 100 depicted in FIG. 1 is one example of an output device that could be used to print images. Printing systems having some, all, or none of the aforementioned components could also be in accordance with the techniques described herein.

Figure 2:
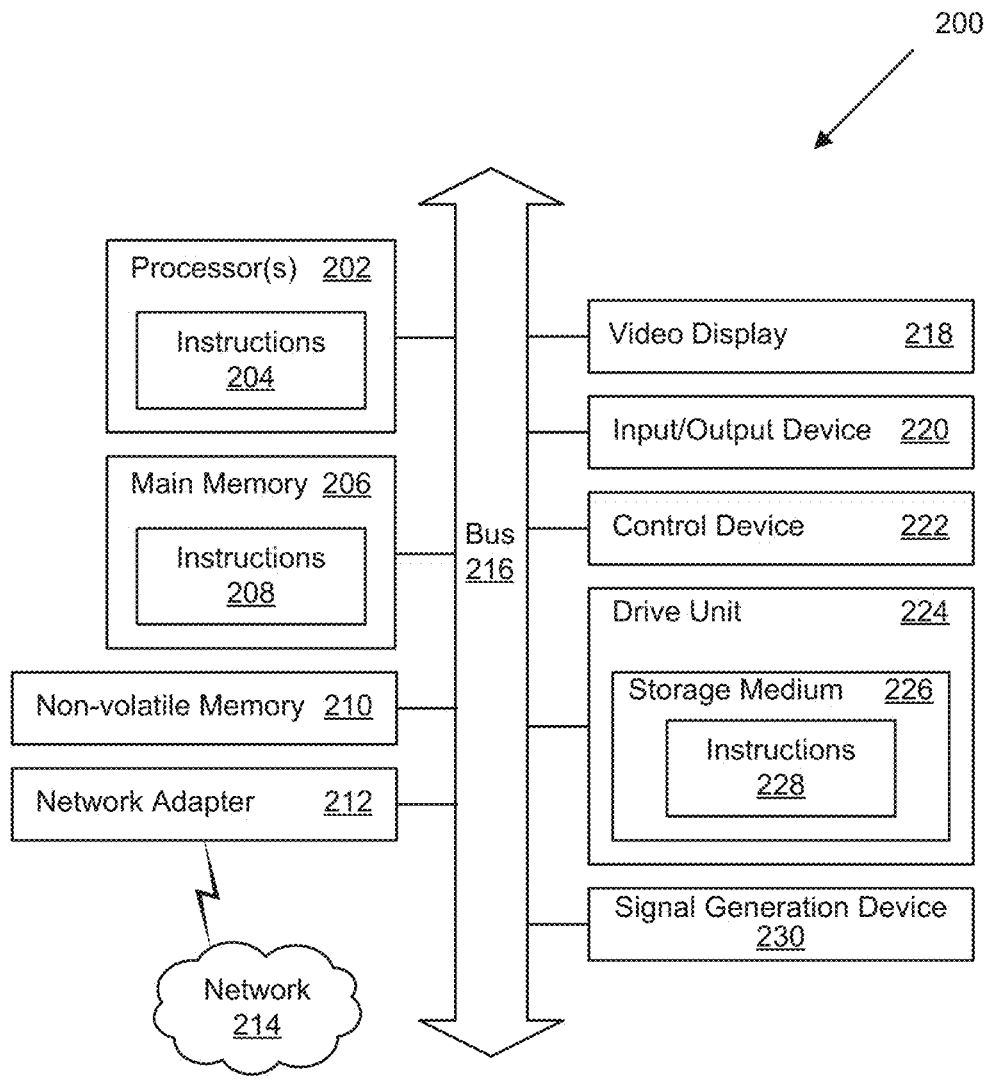
FIG. 2 is a block diagram illustrating an example of a processing system in which at least some operations described herein can be implemented.

FIG. 2 is a block diagram illustrating an example of a processing system 200 in which at least some operations described herein can be implemented. The processing system may include one or more central processing units ("processors") 202, main memory 206, non-volatile memory 210, network adapter 212 (e.g., one or more network interfaces), video display 218, input/output devices 220, control device 222 (e.g., keyboard/pointing devices), drive unit 224 including a storage medium 226, and signal generation device 230 that are communicatively connected to a bus 216. The bus 216 is illustrated as an abstraction that represents one or more separate physical buses, point-to-point connections, or both that are connected by appropriate bridges, adapters, or controllers. Therefore, the bus 216 can include a system bus, Peripheral Component Interconnect (PCI) bus or PCI-Express bus, HyperTransport interface, Industry Standard Architecture (ISA) bus, Small Computer System Interface (SCSI) bus, Universal Serial Bus (USB), Inter-Integrated Circuit (I2C or I$^2$C) bus, or Institute of Electrical and Electronics Engineers (IEEE) standard 1394 bus (also referred to as "Firewire").

In some embodiments the processing system 200 operates as part of a printing system (e.g., printing system 100 of FIG. 1), while in other embodiments the processing system 200 is communicatively connected to the printing system via a wired channel or a wireless channel. Moreover, the processing system 200 could also operate as part of a standalone computing device that is not communicatively connected to any printing systems. Accordingly, the processing system 200 may be part of a personal computer, tablet computer, personal digital assistant (PDA), game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality systems (e.g., a head-mounted display such as Oculus Rift® and Microsoft Hololens®), or another electronic device capable of executing a set of instructions (sequential or otherwise) that specify action(s) to be taken by the processing system 200.

While the main memory 206, non-volatile memory 210, and storage medium 226 (also referred to as a "machine-readable medium") are shown to be a single medium, the term "storage medium" should be taken to include a single medium or multiple media (e.g., centralized or distributed databases, and/or associated caches and servers) that store one or more sets of instructions 228. The term "storage medium" shall also be taken to include any medium that is capable of storing, encoding, or carrying a set of instructions for execution by the processing system and that cause the processing system to perform any of the methodologies of the embodiments.

In general, the routines executed to implement the embodiments may be implemented as an operating system process or a dedicated application, component, program, object, module, or sequence of instructions (which are collectively referred to as "computer programs"). The computer programs typically comprise one or more instructions (e.g., instructions 204, 208, 228) set at various times in various memory/storage devices in a computing device, and that, when read and executed by the processor(s) 202, cause the processing system 200 to perform operations to execute elements involving the various aspects of the embodiments.

Moreover, while certain embodiments may be described in the context of fully functioning computers and output devices (e.g., printer assemblies), those skilled in the art will appreciate that the embodiments are capable of being distributed as a software program product in a variety of forms. The disclosure applies equally regardless of the particular type of machine or computer-readable media used to actually effect the distribution.

Further examples of machine-readable (storage) media include, but are not limited to, recordable media such as volatile and non-volatile memory devices 210, floppy disks and other removable disks, hard disk drives, optical disks (e.g., Compact Disk Read-Only Memory (CD ROMS) and Digital Versatile Disks (DVDs)), and transmission media, such as digital communication links and analog communication links.

The network adapter 212 enables the processing system 200 to mediate data in a network 214 with an entity that is external to the processing system 200 through any known/ convenient communications protocol supported by the processing system 200 and the external entity. For example, the processing system 200 and the external entity may communicate via Wi-Fi, Bluetooth®, Near Field Communication (NFC), cellular, infrared, radio-frequency identification (RFID), etc. Accordingly, the network adapter 212 can include a network adaptor card, a wireless network interface card, a router, an access point, a wireless router, a switch, a multilayer switch, a protocol converter, a gateway, a bridge, a bridge router, a hub, a digital media receiver, a repeater, or some combination thereof.

In some embodiments, the network adapter 212 includes a firewall that governs and/or manages permission to access/proxy data in a computer network, and tracks varying levels of trust between different machines and/or applications. The firewall can include any number of modules having combinations of hardware component(s) and/or software component(s) able to enforce a specified set of access rights. The firewall may also manage (or have access to) an access control list that details permissions, including the access/operation rights of an object by an individual, a machine, and/or an application, and the circumstances under which the permission rights stand.

The techniques introduced here implemented by, for example, programmable circuitry (e.g., one or more microprocessors) programmed with software and/or firmware, entirely in special-purpose hardwired (i.e., non-programmable) circuitry, or in a combination of such forms. Circuitry can be in the form of application-specific integrated circuits (ASICs), programmable logic devices (PLDs), field-programmable gate arrays (FPGAs), etc.

FIG. 3 is a flow diagram of a process 300 for visualizing the color content of a digital image. A source image in a Red Greed Blue (RGB) color space is initially acquired by a processing system (step 301). The RGB color space could be a standard RGB (sRGB) color space, an Adobe RGB color space, or some other RGB color space. The processing system may come to possess the source image in several different ways. For example, in some embodiments the source image is uploaded by an individual through a user interface, while in other embodiments the source image is automatically retrieved from a network-accessible storage on behalf of the individual.

The processing system can then transform the RGB color space into a Lab color space to produce a transformed image from the source image (step 302). A Lab color space mathematically describes all perceivable colors in three dimensions (i.e., L for lightness, a for the color opponents green-red, and b for the color opponents blue-yellow). Although the terminology "Lab color space" originates from the Hunter 1948 color space, it can also be used as an abbreviation for the CIEL*a*b 1976 color space. Other examples of color spaces with Lab representations make use of the CIE 1994 color difference and the CIE 2000 color difference.

The processing system can then bin a range of color values in the transformed image (step 303). More specifically, the processing system can divide the Lab color space into a series of bins that represent unique color values, and then establish a count for each bin by counting occurrences of each unique color value in the transformed image.

Finally, the processing system can create an interactive 3D histogram that represents distribution of the range of color values across the transformed image (step 305). Because the transformed image is in the Lab color space, the three axes of the histogram will typically be lightness (i.e., L), the color opponents green-red (i.e., a), and the color opponents blue-yellow (i.e., b). These variables could be assigned to the x-axis, y-axis, and z-axis in any manner.

FIG. 4 is a flow diagram of a process 400 for visualizing the color content resulting from printing a digital image. A first image in a Red Greed Blue (RGB) color space is initially acquired by a processing system (step 401). As noted above, in some embodiments the source image is uploaded by an individual through a user interface, while in other embodiments the source image is automatically retrieved from a network-accessible storage on behalf of the individual. Consequently, the processing system may perform the process 400 for multiple digital images to determine which digital image(s) are expected to have the highest print quality (e.g., the most accurate color replication). The multiple digital images could include a series of different digital images or multiple copies of the same digital image having different characteristics (e.g., hue or brightness).

The processing system can then transform the RGB color space into a Lab color space to produce a second image from the first image (step 402). Because the Lab color space mathematically describes all perceivable colors in three dimensions, the Lab color space is printer independent. That is, the Lab color space values assigned to each pixel apply regardless of what type of output device is used to ultimately create the corresponding image.

The processing system can then transform the Lab color space into a printer-specific color space to produce a third image from the second image (step 403). The printer-specific color space represents the range of colors that can be reproduced by a given output device. For example, the printer-specific color space may correspond to Hi-Fi ink configurations that expand the tonal range of printed images by augmenting Cyan Magenta Yellow Black (CMYK) inks with one or more additional inks, such as Orange, Green, Violet, Blue, Red, etc. Accordingly, examples of printer-specific color spaces include a CMYK Orange Green (CMYKOG) color space, a CMYK Orange Green Violet (CMYKOGV) color space, a CMYK Red (CMYKR) color space, a CMYK Red Green Blue (CMYKRGB) color space, a CMYK Green Blue (CMYKGB) color space, etc. Hi-Fi ink configurations enable output devices to achieve a larger gamut of colors, which results in better reproduction of spot colors and highly-chromatic RGB colors.

The processing system can then transform the printer-specific color space back into the Lab color space to produce a fourth image from the third image (step 404). Transforming the Lab color space to the printer-color space and then back to the Lab color space allows gamut limitations of an output device (e.g., a printing assembly) to be readily identified. Said another way, such a technique enables the processing system to identify those color(s) in the first image that cannot be accurately reproduced by the output device.

The processing system can then bin a range of color values in the fourth image (step 405). More specifically, the processing system can divide the Lab color space into a series of bins that represent unique color values, and then establish a count for each bin by counting occurrences of each unique color value in the fourth image.

Each Lab color space value can be represented using 8 bits, which causes the Lab color space to include $2^{24}$ unique color values. Consequently, in some embodiments, the processing system quantizes the bins so that similar color values are aggregated into a single bin (step 406). For example, quantizing the entire Lab color space to be represented as $2^{18}$ bins (rather than $2^{24}$ bins) assists in visualization of the color range of the transformed image. Such techniques also enable the processing system to more readily parse and examine color data associated with digital images. Finally, the processing system can create an interactive 3D histogram that represents distribution of the range of color values across the fourth image (step 407).

In some embodiments, the processing system also creates an interactive 3D histogram that represents distribution of the range of color values across the first image. More specifically, the processing system may bin the range of color values in the first image by dividing the RGB color space into a series of bins that represent unique color values, and then establishing a count for each bin by counting occurrences of each color value in the first image. The creation of multiple interactive 3D histograms allows a user to readily discover which colors, if any, are being clipped by a printing assembly. In fact, the processing system may allow the user to compare interactive 3D histograms corresponding to any color space (e.g., the RGB color space, the Lab color space, and/or the printer-specific color space).

Figure 5:
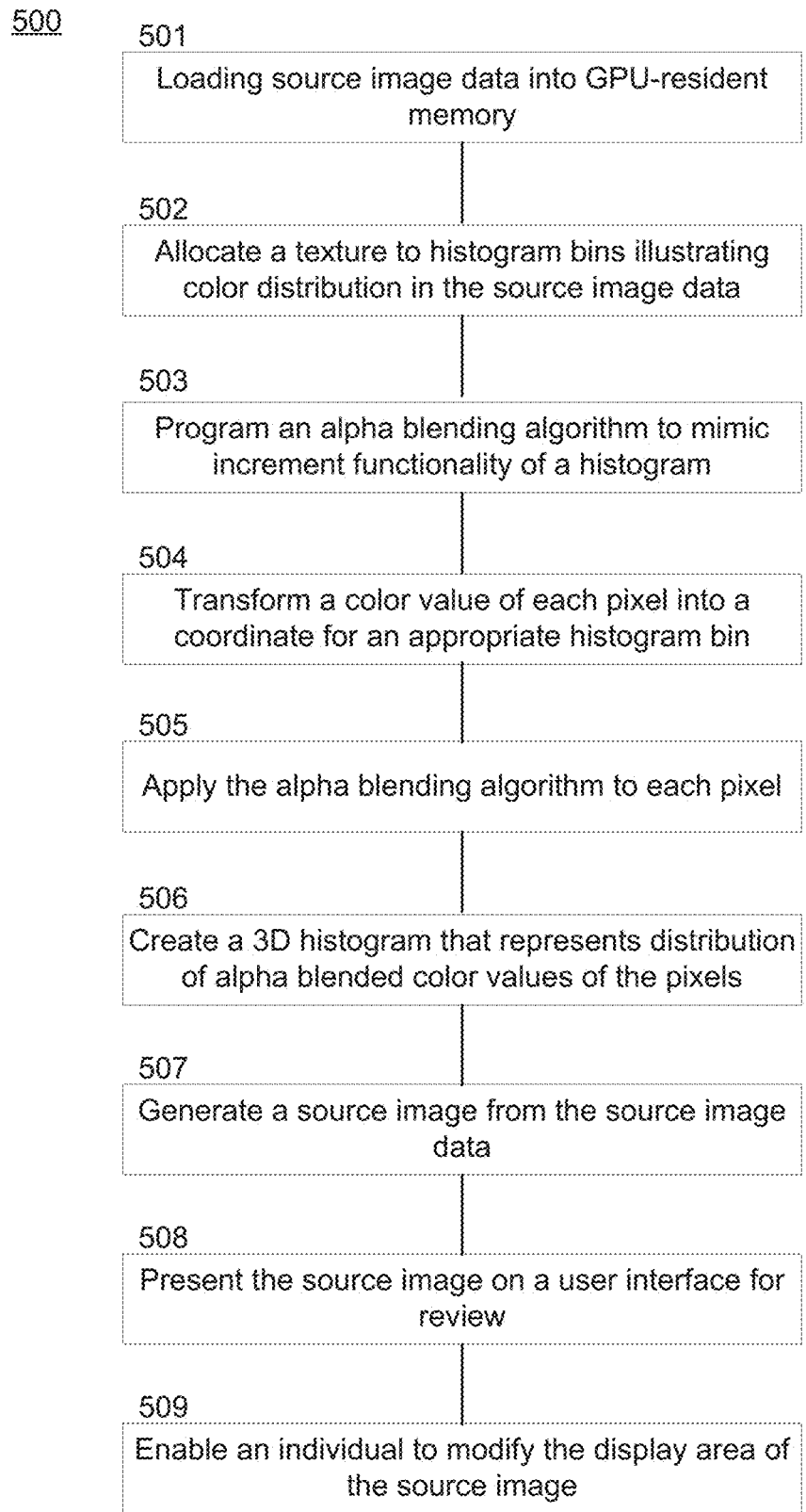
FIG. 5 is a flow diagram of a process for optimizing image transformation by using textures available to a graphical processing unit (GPU).

However, to interactively implement these processes in real time, several highly optimized techniques must be employed. Generally, the highly optimized techniques make use of various functionalities of a graphical processing unit (GPU) included in the processing system. FIG. 5, for example, is a flow diagram of a process 500 for optimizing image transformation by using textures available to a GPU. Image data associated with a source image is initially loaded into GPU-resident memory (step 501). In some embodiments, sub-sampled image data rather than the original image data is loaded into the GPU-resident memory.

A texture can then be allocated to a series of histogram bins that illustrate the distribution of color values of pixels included in the image data (step 502). The series of histogram bins can include a two-dimensional (2D) set of bins or a three-dimensional (3D) set of bins. Moreover, the texture can be a 2D texture or a 3D texture.

In some embodiments, an alpha blending algorithm is programmed to mimic the increment functionality of a histogram (step 503). Alpha blending refers generally to the process of combining a translucent foreground color with a background color to produce a new blended color. The degree of the foreground color's translucency may range from substantially transparent to substantially opaque. For example, if the foreground color is completely transparency, then the blended color will be the background color. As another example, if the foreground color is completely opaque, then the blended color will be the foreground color. Those skilled in the art will recognize that because translucency can range between these extremes, the blended color is typically computed as a weighted average of the foreground color and the background color.

More specifically, alpha blending can be described as a convex combination of two colors allowing for transparency effects in computer graphics. The value of alpha in the color code ranges from 0.0 to 1.0, where 0.0 represents a fully transparent color and 1.0 represents a fully opaque color. Accordingly, he value of the resulting color is given by:

$$out_A = src_A + dst_A(1-src_A)$$

$$out_{RGB} = src_{RGB} src_A + dst_{RGB} dst_A (1-src_A) \div out_A.$$

Accordingly, if $out_A=0$, then $out_{RGB}=0$.
Moreover, if $out_A=1$, then $out_{RGB}=src_{RGB} src_A + dst_{RGB}(1-src_A)$.
Accordingly, if $Out_A=0$, then $out_{RGB}=0$, and if $Out_A=1$, then $out_{RGB}=Src_{RGB} src_A + dst_{RGB}(1-src_A)$. As will be further described below, setting both blending coefficients to 1 also enables the alpha blending algorithm to mimic the increment functionality of a histogram.

The color value of each pixel included in the image data can then be transformed into a coordinate for an appropriate histogram bin (step 504), and the alpha blending algorithm can be applied to each pixel (step 505). In some embodiments, color value transformation is optimized by the use of lookup tables that are implemented directly in a shading programming language used by the GPU. The shading programming language may be, for example, OpenGL Shading Language (GLSL). For example, multiple lookup tables could be stored in the GPU-resident memory that facilitate transformations between color spaces having different numbers of components.

An interactive 3D histogram that represents the distribution of alpha blended color values of the pixels included in the image data can then be created (step 506). In some embodiments, a source image is also generated from the image data (step 507) and presented on a user interface for review (step 508). An individual may also be able to modify the display area of the source image shown on the user interface by altering a 3D coordinate at each corner of the source image (step 509).

Unless contrary to physical possibility, it is envisioned that the steps described above may be performed in various sequences and combinations. For example, the source image may be created and shown in the user interface before the alpha blending algorithm is applied to each pixel included in the image data.

Other steps could also be included in some embodiments. For example, a blended image could be generated using the alpha blended color values produced by the alpha blending algorithm, and then shown instead of (or in addition to) the source image generated using the image data.

Use Cases

Introduced here are techniques for interactively determining/visualizing the color content of a source image, and techniques for discovering how the color content of the source image maps to the color gamut achievable by a given output device (e.g., a printing assembly). Such techniques involve several concepts:

Color Transformation—This refers to the calculation where the color of each pixel in a source image is converted to a different representation (e.g., a device-independent representation such as a Lab color space, or a device-specific representation such as a Hi-Fi color space). Transformations are typically non-linear in nature because they involve color spaces having different numbers of components (e.g., the Lab color space includes three components, while the CMYK color space includes four components, and the CMYKOGV color space includes seven components). Accordingly, transformations are often implemented as multi-dimensional lookup tables as specified by ICC profiles.

Histogram Accumulation—Color histograms are generated by counting the occurrences of each unique color value. However, histogram bins may be quantized so that substantially similar colors are aggregated into a single bin. For example, when Lab color space values are represented using 8 bits, the Lab color space includes $2^{24}$ unique color values. To assist in visualization, a processing system may quantize the entire Lab color space to be represented as $2^{18}$ bins (rather than $2^{24}$ bins). Although specific numbers have been provided for the purpose of illustration, nearly any degree of quantizing can be performed by the processing system.

3D Viewing of Histogram Bins—A processing system can generate a 3D scene model that displays the histogram bins in any known color space. In some embodiments, the histogram bins are shown in an industry-standard color space, such as the Lab color space.

Color Transformations

As noted above, to interactively implement these features, several highly optimized techniques must be employed. Generally, the highly optimized techniques make use of various functionalities of a GPU that is included in the processing system (e.g., processing system 200 of FIG. 2).

For example, image data (or sub-sampled image data) associated with a digital image can be initially loaded into GPU-resident memory. More specifically, the image data could be loaded into "textures" (i.e., 3D coordinate mapped image data). Once this has been completed, the digital image may be presented for review on a user interface. For example, the digital image may be displayed using user interface application program interface (API) (also referred to as a "window API") that are supported by the operating system of the processing system. In some embodiments, individuals are able to zoom/pan the digital image by modifying the 3D coordinates at each corner of the digital image.

Color transformations can be optimized by the use of GPU-enabled 3D textures (Which can be thought of as multiple 2D images that are stacked into a third dimension). Oftentimes, transformations are implemented via pre-programmed lookup tables. 3D lookup table(s) can be implemented directly in the shading programming language used by the GPU. The shading programming language may be OpenGL Shading Language (GLSL).

Various examples of GLSL code are shown below. Clut is a 3D texture that includes the appropriate data necessary to implement the required transformation.

Color transformations from three components to three components (e.g., sRGB color space to Lab color space) can be implemented using the following GLSL code:

```
Vec3 lab_Output=texture(clut, sRGB_input.xyz).rgb.
```

Color transformations from three components to four components (e.g., Lab color space to CMYK color space) can be implemented using the following GLSL code:

```
Vec4 CMYK_Output=texture(clut, Lab_input.xyz).rgba.
```

Color transformations from three components to seven components (e.g., Lab color space to CMYKOGV color space) can be implemented using the following GLSL code:

```
Vec4 CMYK_Output=texture(clut1, Lab_input.xyz).rgba
Vec3 OGV_Output=texture (clut2, Lab_input.xyz).rgb.
```

Color transformations from four components to three components (e.g., CMYK color space to Lab color space) can be implemented using the following GLSL code:

```
vec4 clut4to3(vec4 input1)
{
// CMYK to Lab conversion using cluts in 3D texture vec4 fcmykin;
// "gpu coords", offset and scaled
fcmykin.rgb=((input1.rgb*(ngrid-1.0))+0.5)/ngrid;
// "node coords"
fcmykin.a=(input1.a*(ngrid-1.0));
vec4 fcmykin2=fcmykin;
float floork=floor(fcmykin.a);
float alpha=fcmykin.a-floork;
// c,m,y in gpu coords k in node coords
fcmykin.x (fcmykin.r+floork)/ngrid;
fcmykin2.x=fcmykin.x+(1.0/ngrid);
return vec4(mix(texture(clut, fcmykin.xyz), texture(clut, fcmykin2.xyz), alpha) .rgb, 1.0);
}
```

Here, "n" 3D textures are employed to implement the fourth dimension of interpolation.

Color transformations from six components to three components (e.g., CMYKOV color space to Lab color space) can be implemented using the following GLSL code:

```
vec4 clut6to3(vec4 input1, vec4 input2)
{
/two three-channel colors from six
vec3 abc=vec3(input1.r, input1.g, input1.b);
vec3 def=vec3(input2.a, input2.r, input2.g);
float nnodes=ngrid; // grid dimension passed in as parameter
abc=abc*(nnodes-1.0);
def=def*(nnodes-1.0);
vec3 floor_def=floor(def);
vec3 ABC=floor_def*nnodes+abc;
float scale=1.0/(nnodes*nnodes);
vec3 xyz0=(ABC+0.5)*scale;
vec3 xyz1=xyz0+1.0/(nnodes);
vec3 alfa=def-floor_def;
float oneminusalfa=1.0-alfa.x;
vec3 fxyzin;
vec4 colorout0;
vec4 colorout1;
vec4 colorout2;
vec4 colorout3;
fxyzin=xyz0;
colorout0=texture3D(clut, fxyzin)*oneminusalfa;
fxyzin=xyz1.x;
colorout0+=texture3D(clut, fxyzin)*alfa.x;
fxyzin.x=xyz0.x;
fxyzin.y=xyz1.y;
colorout1+=texture3D(clut, fxyzin)*oneminusalfa;
fxyzin.x=xyz1.x;
colorout1+=texture3D(clut, fxyzin)*alfa.x;
fxyzin.x=xyz0.x;
fxyzin.y=xyz0.y;
fxyzin.z=xyz0.z;
colorout2=texture3D(clut, fxyzin)*oneminusalfa;
fxyzin.x=xyz1.x;
colorout2+=texture3D(clut, fxyzin)*alfa.x;
fxyzin.x=xyz1.x;
fxyzin.y=xyz1.y;
colorout3=texture3D(clut, fxyzin)*oneminusalfa;
fxyzin.x=xyz1.x;
colorout3+=texture3D(clut, fxyzin)*alfa.x;
oneminusalfa=1.0-alfa.y;
colorout0=colorout0*oneminusalfa+
    colorout1*alfa.y;
colorout2=colorout2*oneminusalfa+
    colorout3*alfa.y;
oneminusalfa=1.0-alfa.z;
colorout0=colorout0*oneminusalfa+
    colorout2*alfa.z;
return vec4(colorout0.rgb, 1.0);
}
```

Here, multiple 3D textures are employed to implement the six dimensions of interpolation.

Histogram Accumulation

Traditional methods of histogram accumulation involve the allocation of a memory array of histogram bins, and then sequentially reading each pixel of a digital image, quantizing if necessary, and incrementing the appropriate bin value.

For example, a common implementation of such a technique may require that a processing system (1) allocate memory corresponding to a 2D/3D set of histogram bins; (2) clear the memory; (3) transform the color value of each pixel into a coordinate for an appropriate bin; and (4) read histogram bin data as required.

However, this process can be accelerated by appropriately programming a GPU. More specifically, GPUs can implement a technique called "alpha blending" whereby a new image can be blended/mixed with existing image data. One example of an alpha blending equation is:

New Destination=Source*1+Prior Destination*1.

When the source value is set to one, the alpha blending equation effectively implemented the required histogram increment functionality. Moreover, because the image data and the histogram bin data can be stored in GPU-resident memory, no central processing unit (CPU) interaction is required on a per pixel basis. A more detailed explanation of the GPU-implemented histogram technique is provided above with respect to FIG. 5. In some embodiments, the GPU-implemented histogram technique is implemented using the following GLSL code:

```
// assume we are writing a 64×4096 image that represents
    a 64×64×64 L*a*b* histogram
// the 4096 dimension is divided into 64 sections of 64×64
    a*b* bins plotted as typical
// a* is x axis [−128, 128], and b* is y axis [−128, 128]
// increasing L* value selects section
void main( )
{
    imgABCD=texture(inImage, vec3(float(g1_InstanceID
        % winSz.x)/winSz.x, float(g1_InstanceID/winSz.x)/
        winSz.y, 0));
    if (channels>4)
        imgEFGH=texture(inImage, vec3(float(g1_InstanceID
            % winSz.x,
        float(g1_InstanceID/winSz.x)/winSz.y, 1));
    vec3 lab=rgb2lab(imgABCD.rgb);
    // g1_Position=projection*vec4(lab.z*64, lab.y*64+floor
        (lab.x*64)*64, 0, 1);
    g1_Position=projection*vec4((lab.z+2.0/256.0)*64,
        (lab.y+2.0/256.0)*64+floor((lab.x+2.0/256.0)*64)
        *64, 0, 1);
}
```

Moreover, the following GLSL code illustrates how writing a small number with alpha blending set correctly implements the accumulation of occurrences:

```
layout(location=0) out float color;
void main( )
{
    color=1/float(0x10000); // 16 bit bin depth
    color=1/float(0x10000)/float(0x10000); // 32 bit bin
        depth
}
```

3D Viewing of Histogram Bins

Due to the non-linear nature of color data and gamut shapes, histogram data generally does not lend itself to traditional 3D bar graph visualization techniques. Instead, plotting markers onto a 3D gamut surface is typically more intuitive to individuals.

The appearance of individuals markers may also be critical in ensuring understanding. For example, the size of the marker may indicate the relative count of a given histogram bin, while the color and/or position may represent the color corresponding to the given histogram bin. Because these markers are often in close proximity to one another, rectangular geometries do not work well. Moreover, the similarities in color exhibited by adjacent markers can make distinguishing them from one another difficult or impossible.

Figure 6:
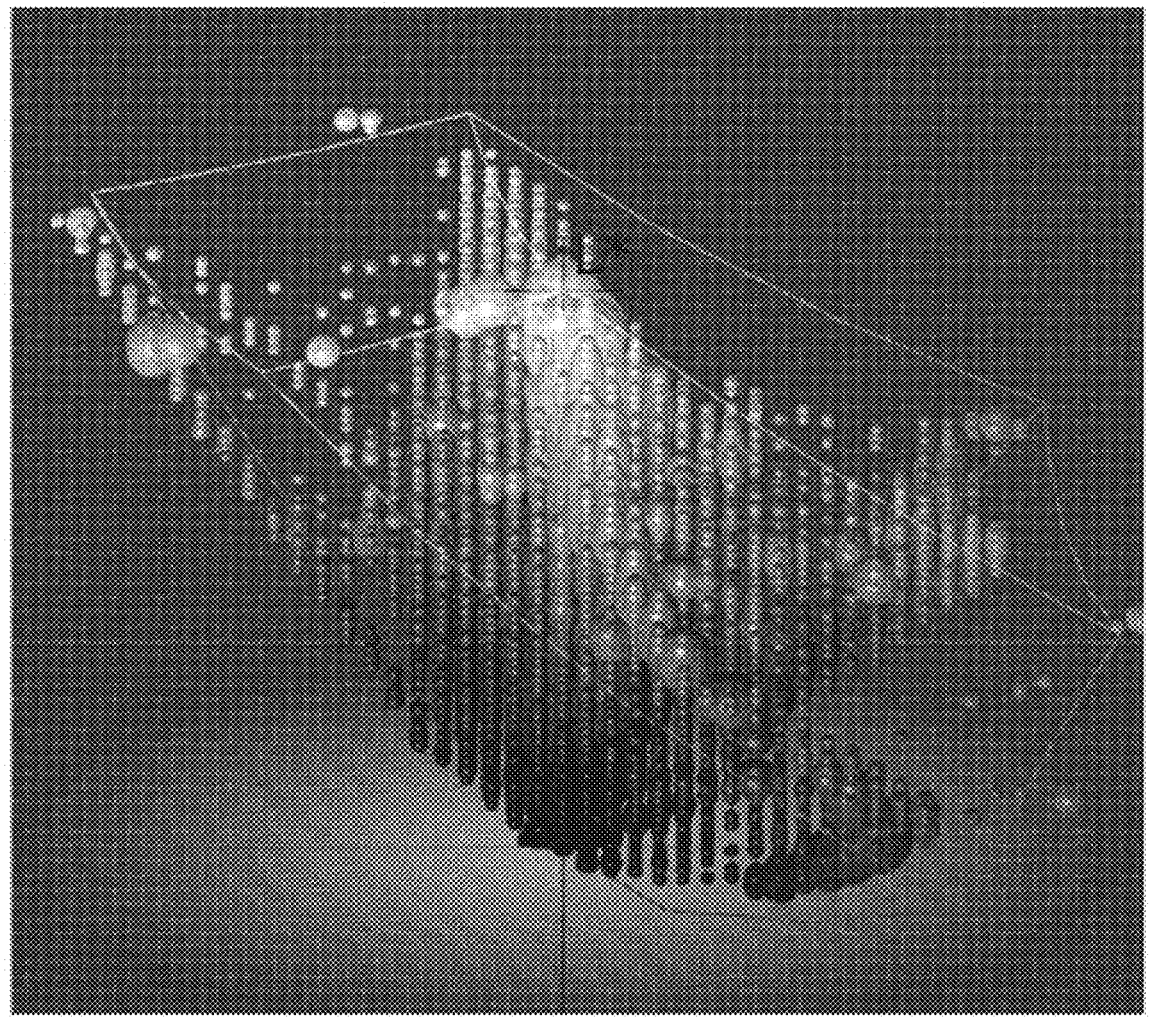
FIG. 6 illustrates an interactive three-dimensional (3D) histogram that uses spheres shaded with specular highlights and ambient lighting shadows.
Figure 7:
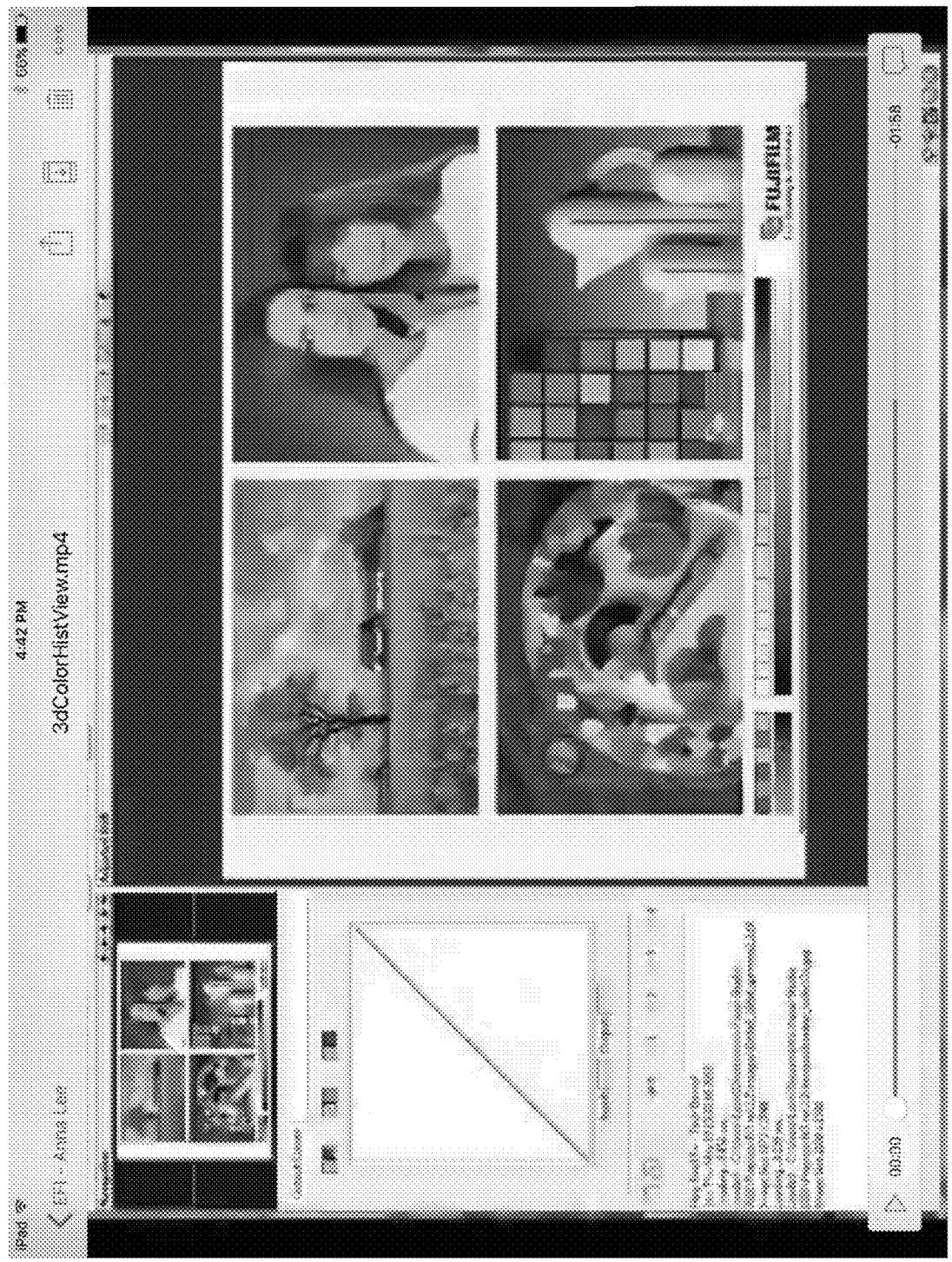
FIG. 7 depicts a user interface that includes a digital image that has been uploaded by a user.
Figure 8:
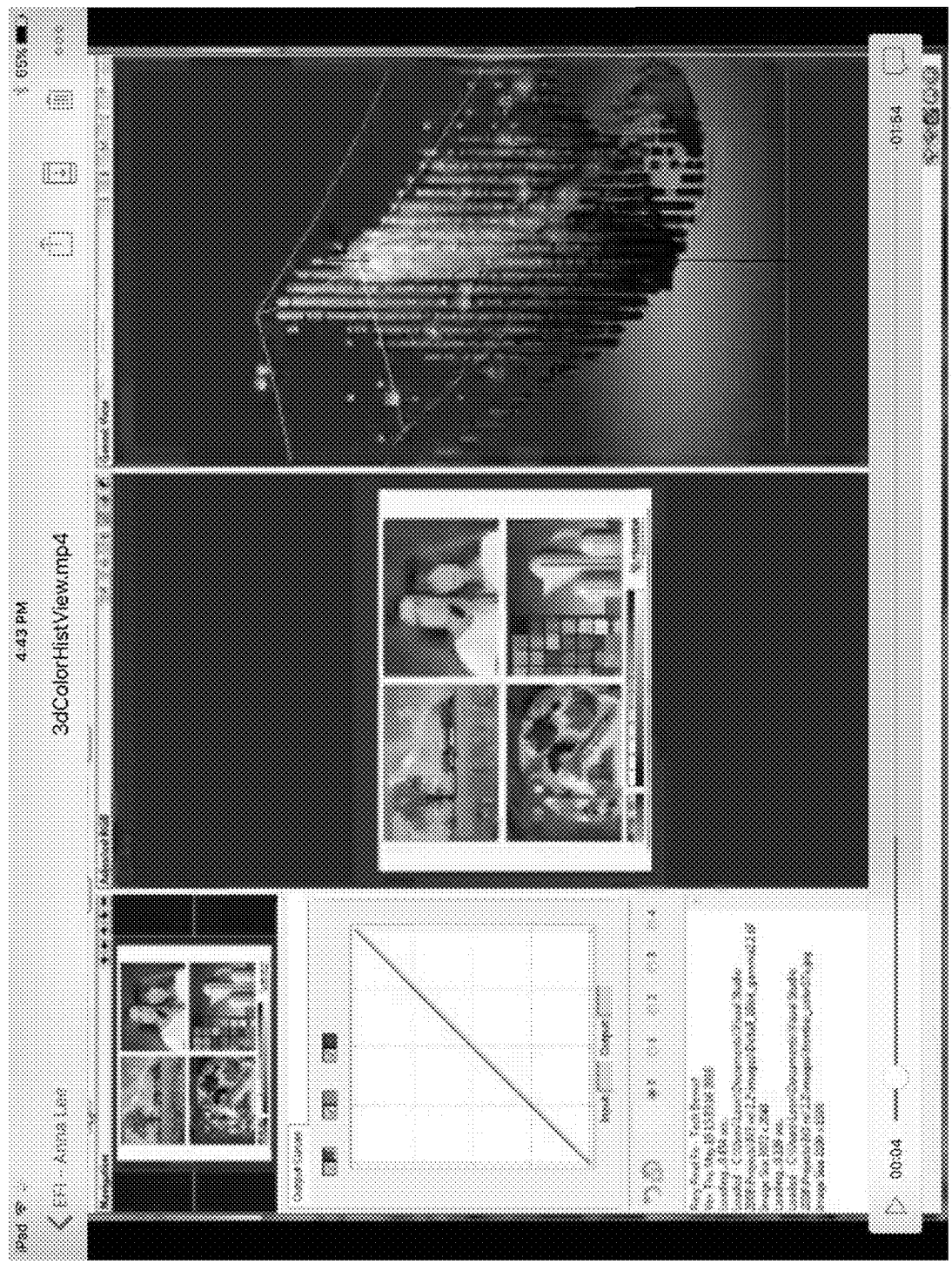
FIG. 8 depicts how a user interface may display a digital image and corresponding interactive 3D histogram simultaneously.
Figure 9:
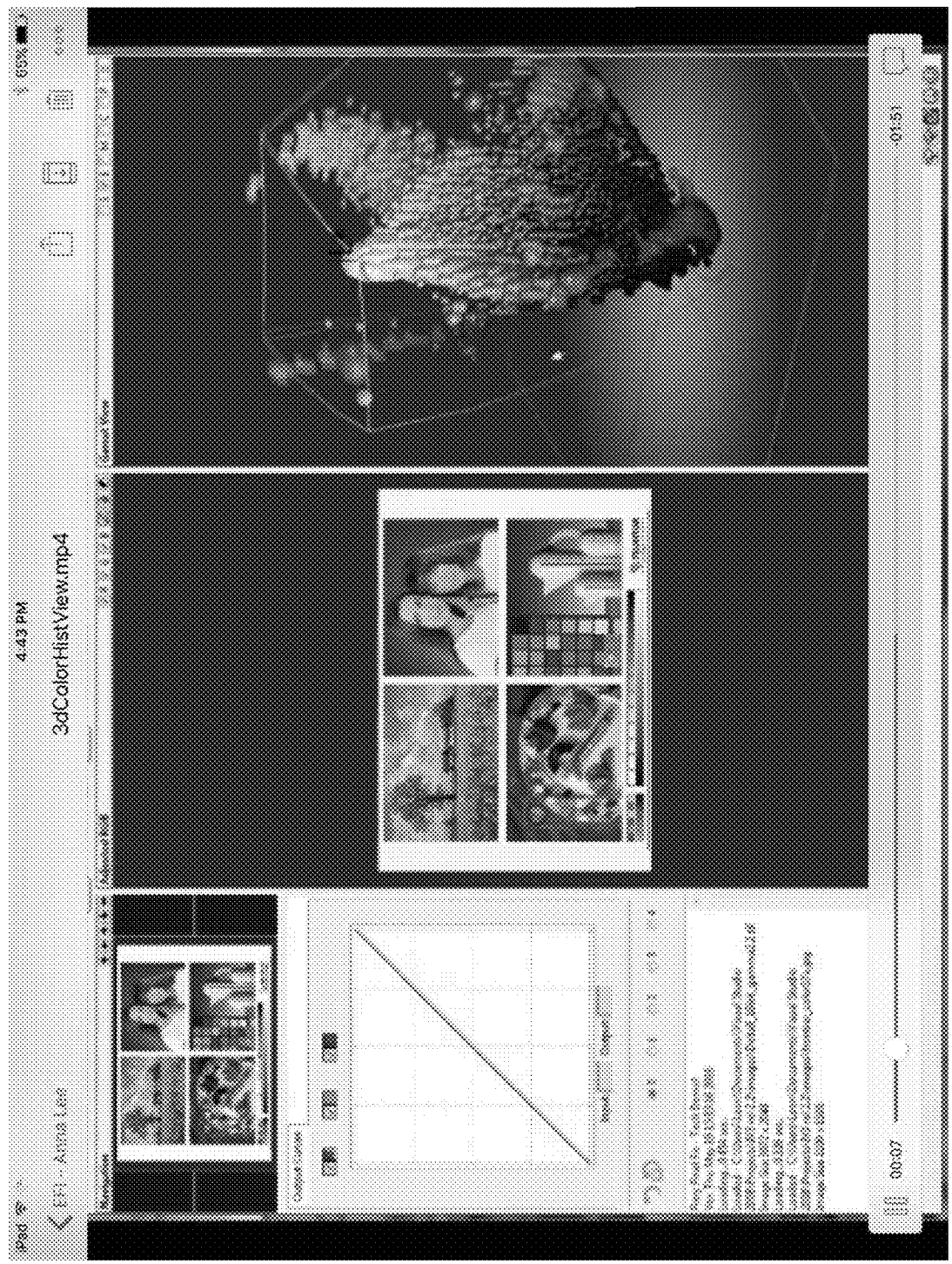
FIGS. 9-22 depict how an individual may be able to pan, zoom, and/or rotate the interactive 3D histogram (e.g., by clicking, dragging, or scrolling) to view different subsets of markers.
Figure 10:
Figure 11:
Figure 12:
Figure 13:
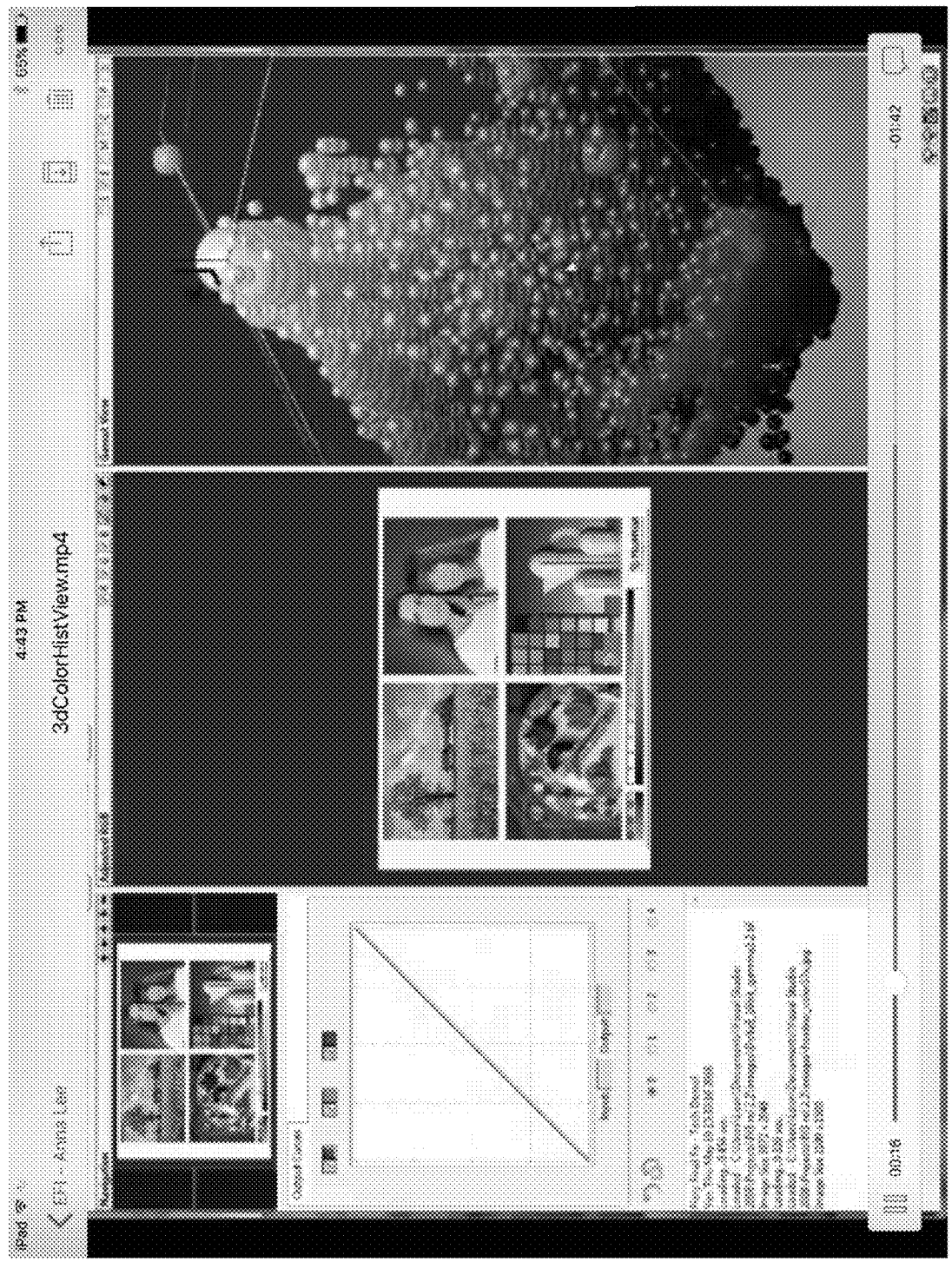
Figure 14:
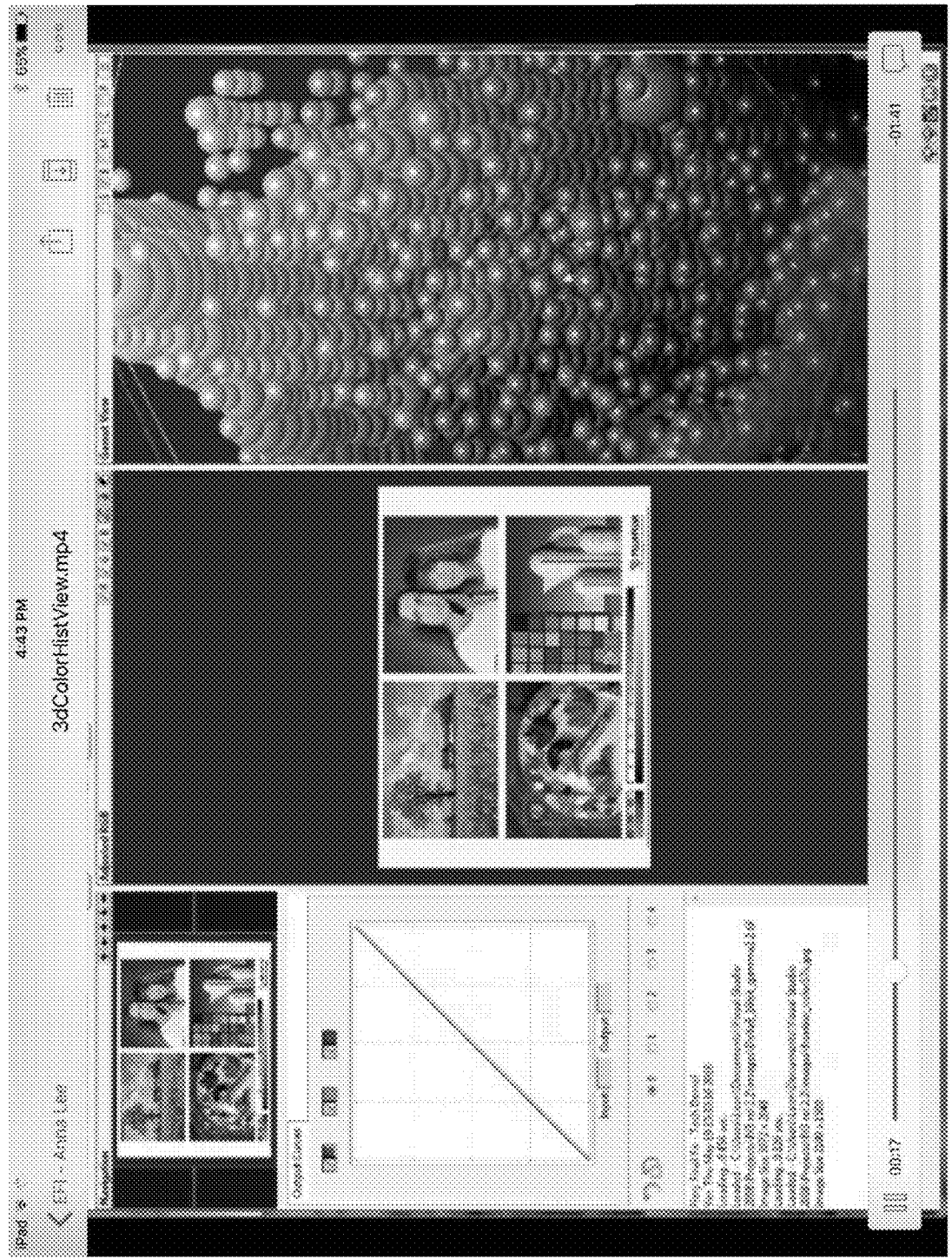
Figure 15:
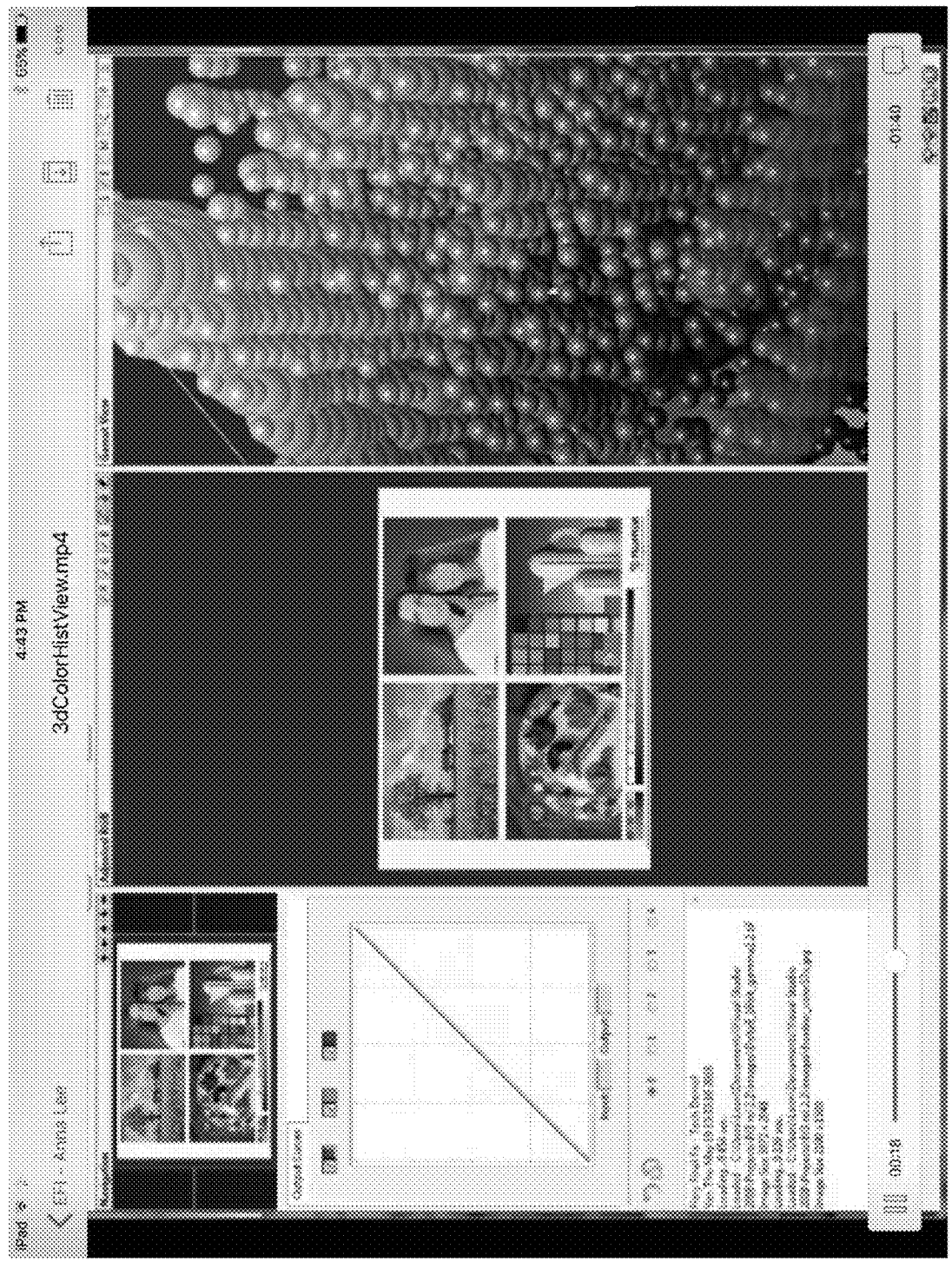
Figure 16:
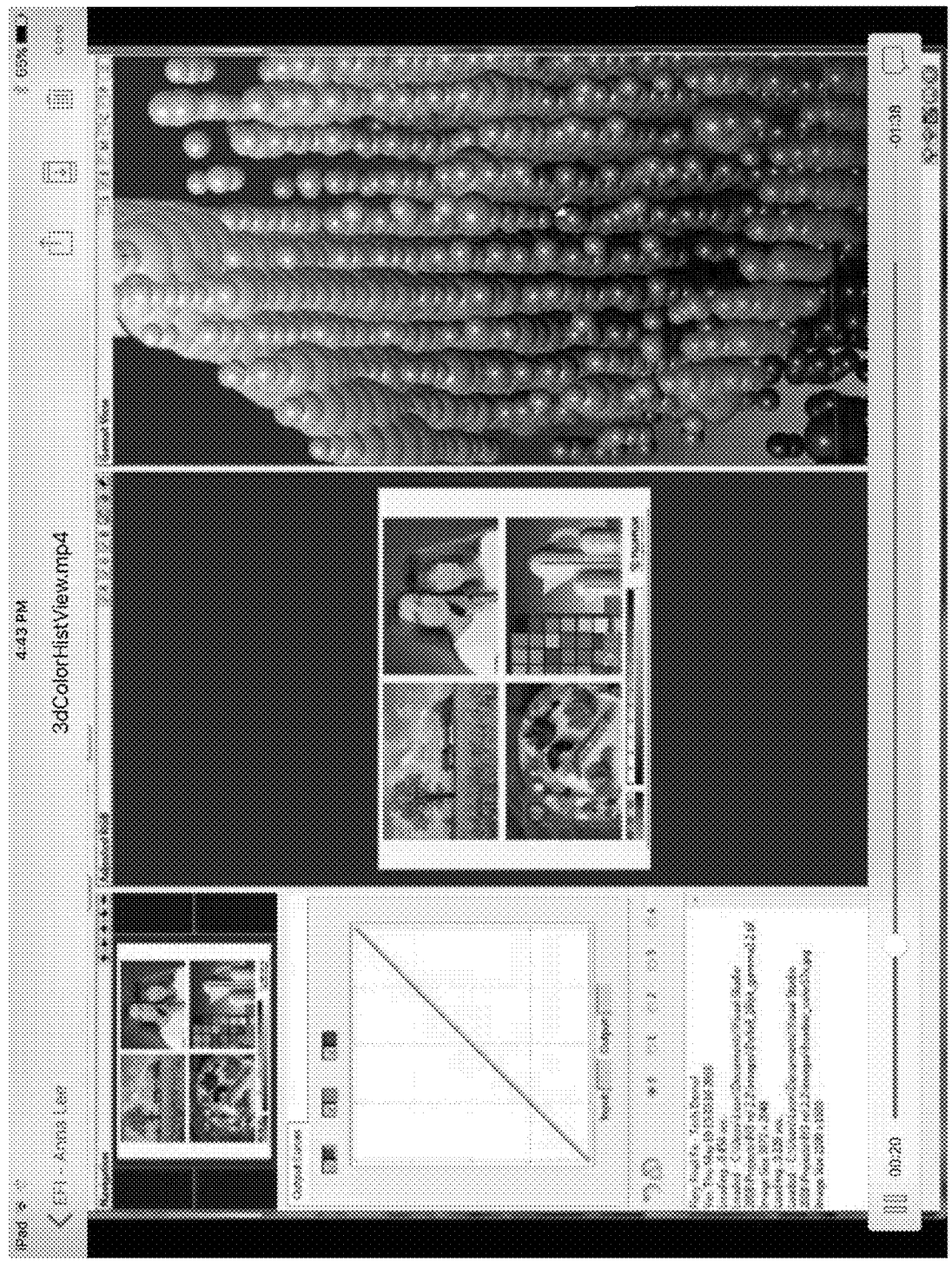
Figure 17:
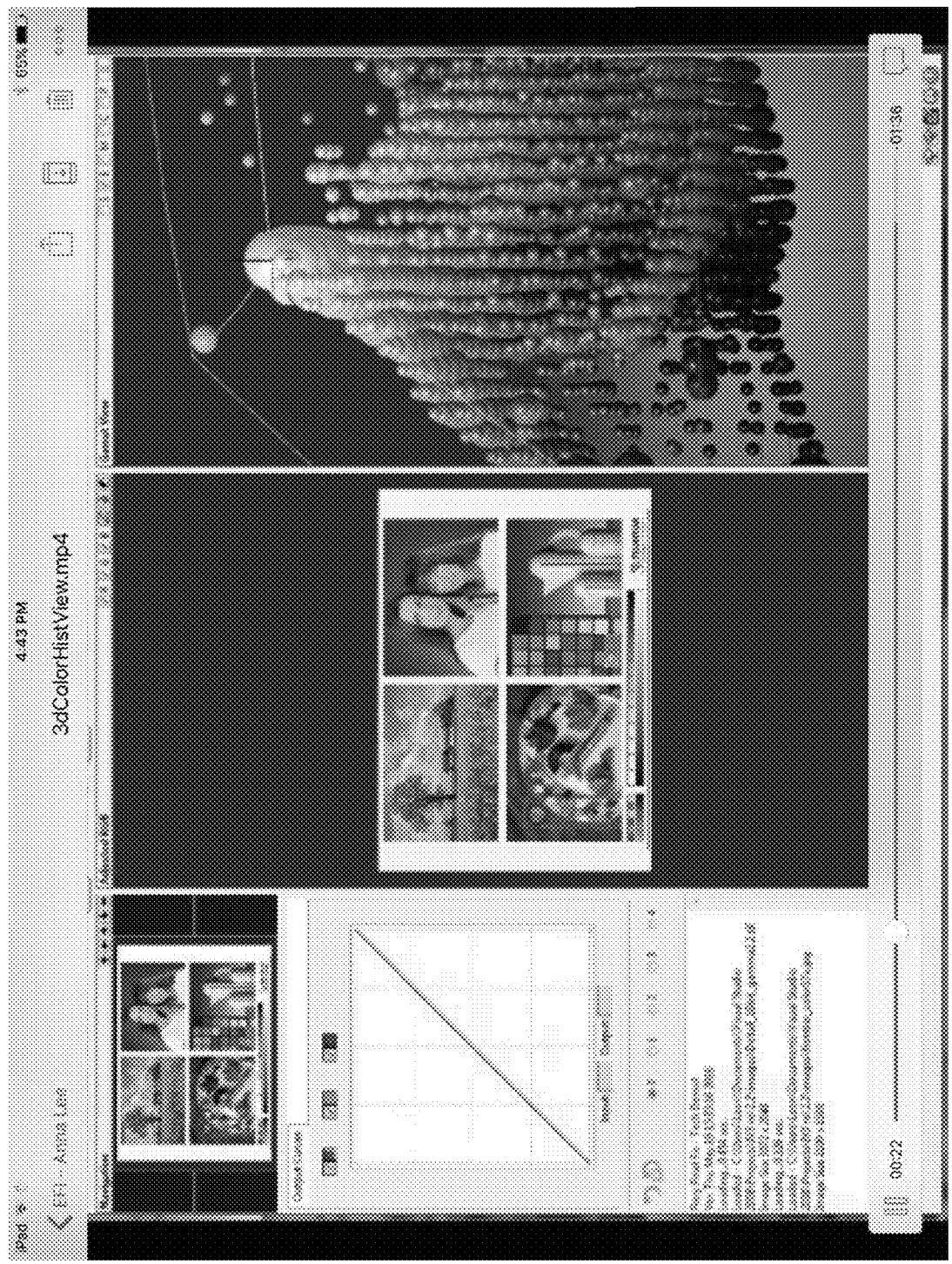
Figure 18:
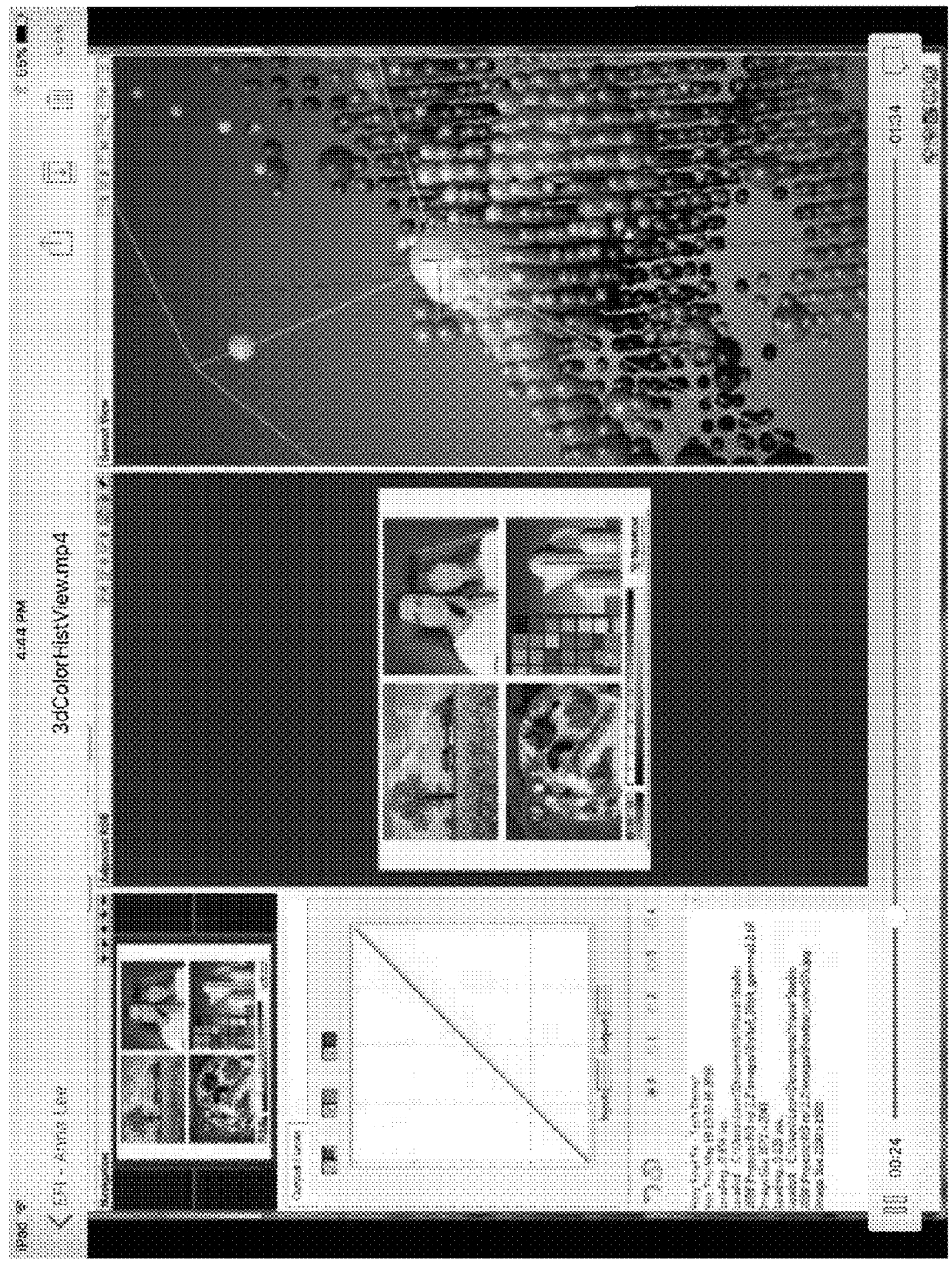
Figure 19:
Figure 20:
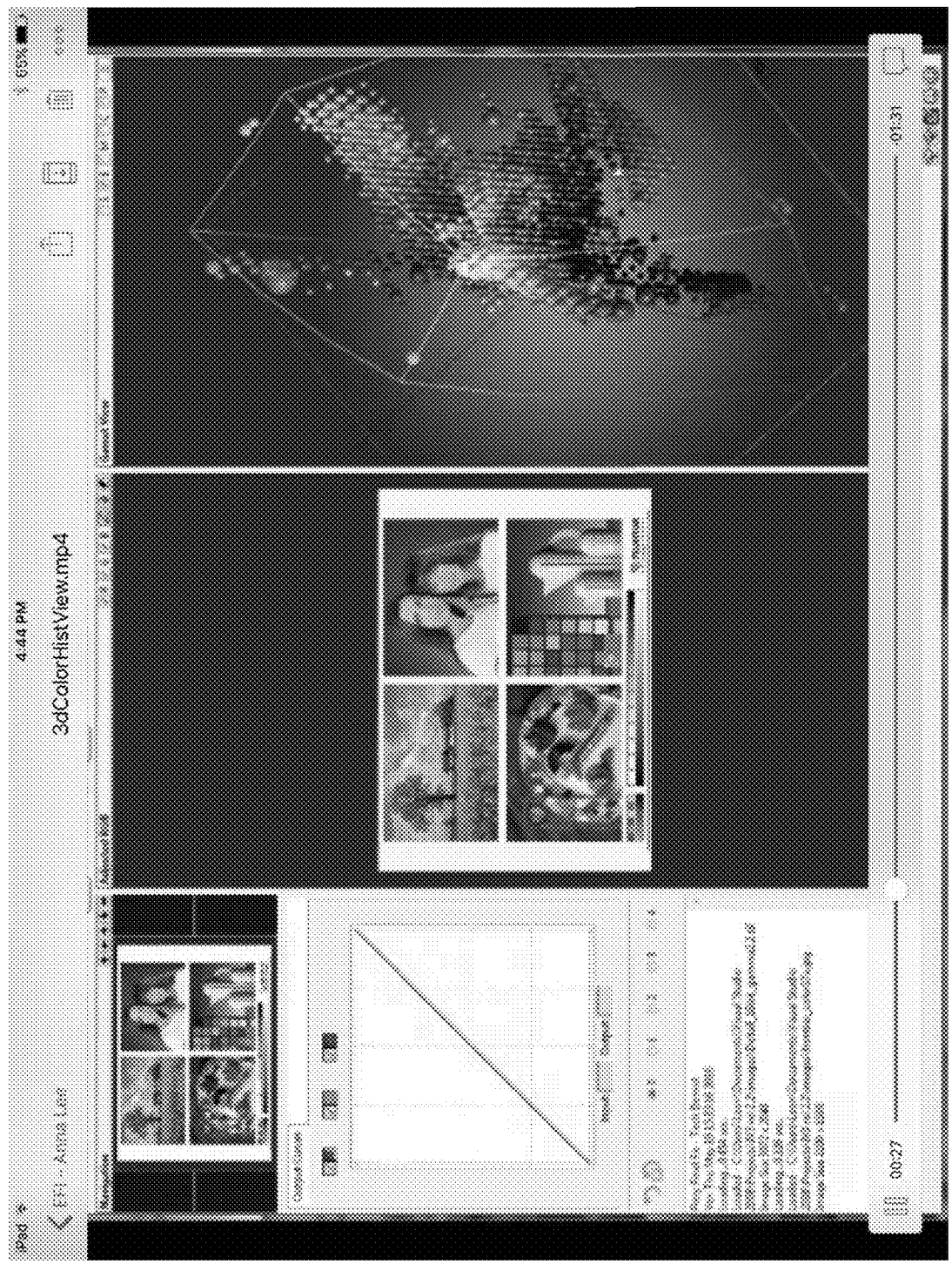
Figure 21:
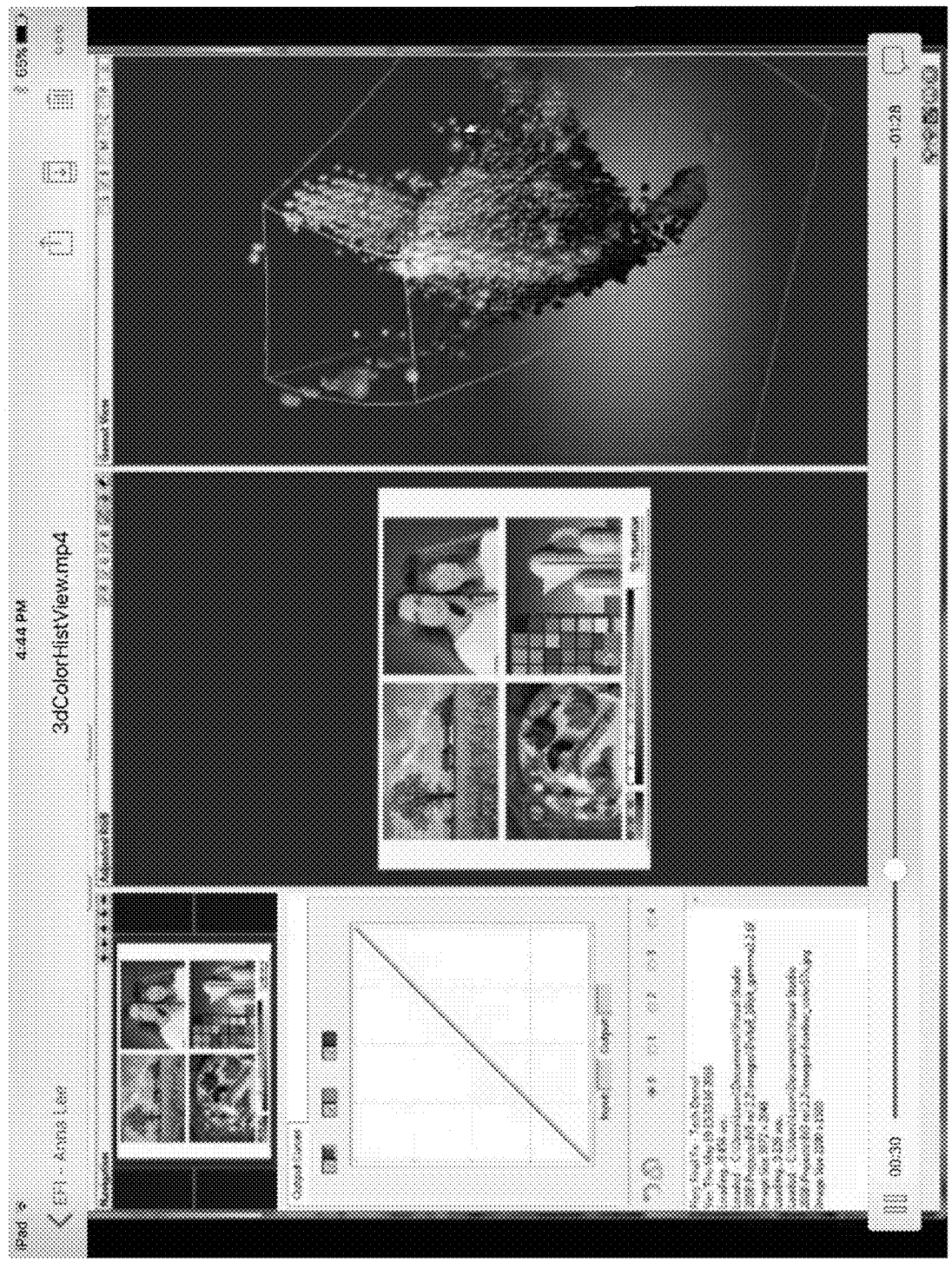
Figure 22:
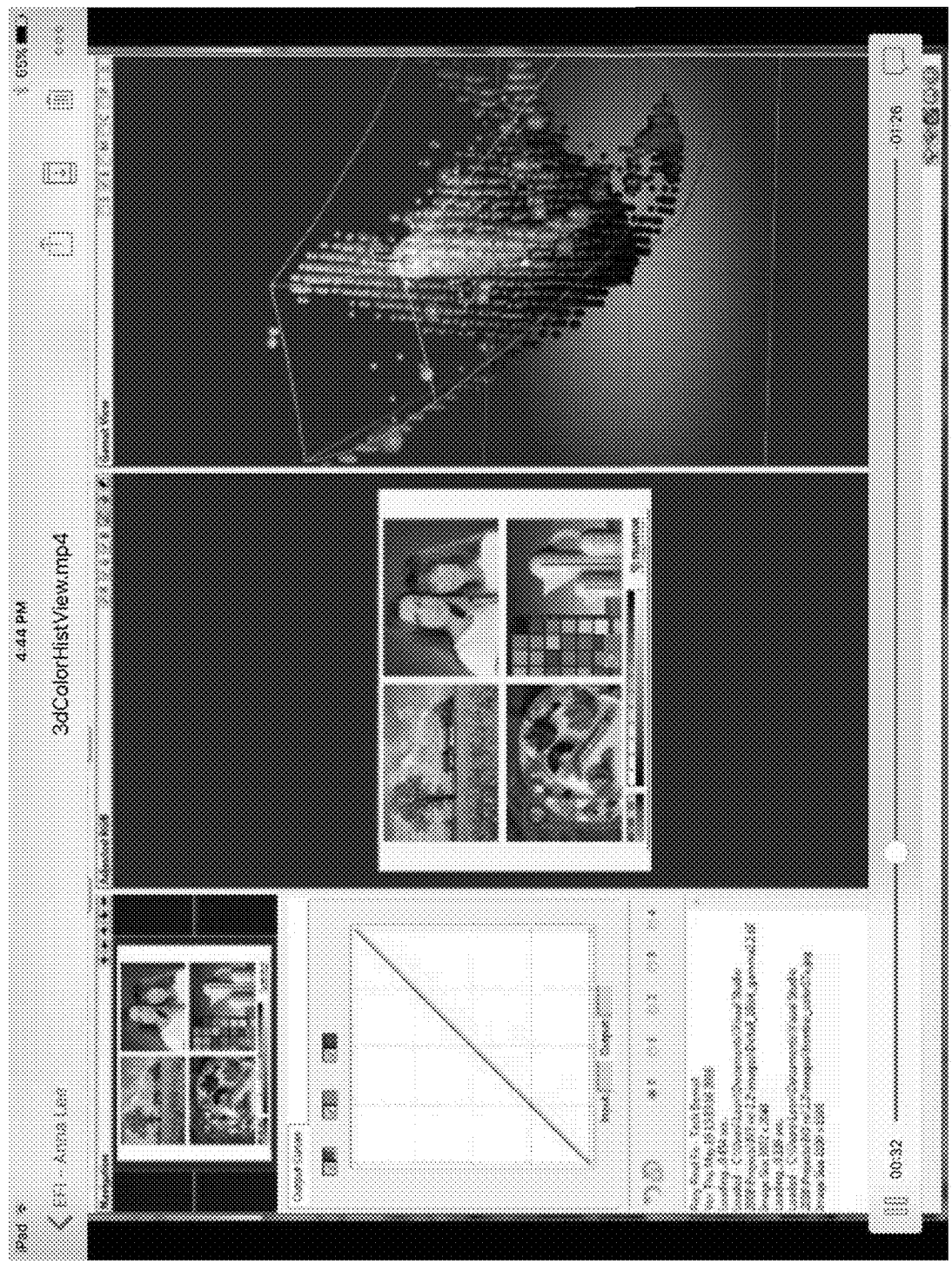
Figure 23:
FIGS. 23-34 illustrates how filtering (e.g., blurring) the digital image and zooming in on certain segments of the digital image affect the interactive 3D histogram.
Figure 24:
Figure 25:
Figure 26:
Figure 27:
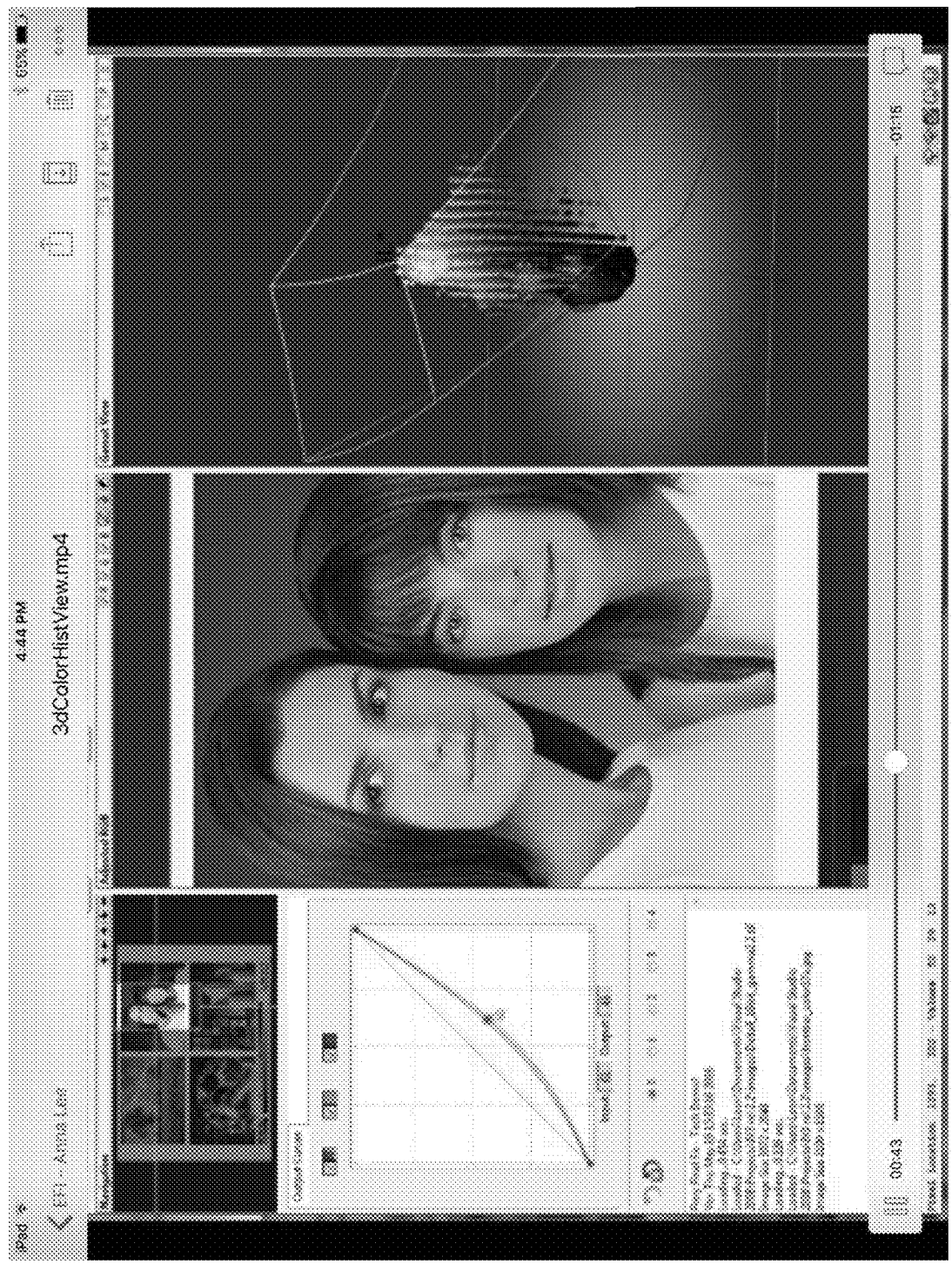
Figure 28:
Figure 29:
Figure 30:
Figure 31:
Figure 32:
Figure 33:
Figure 34:
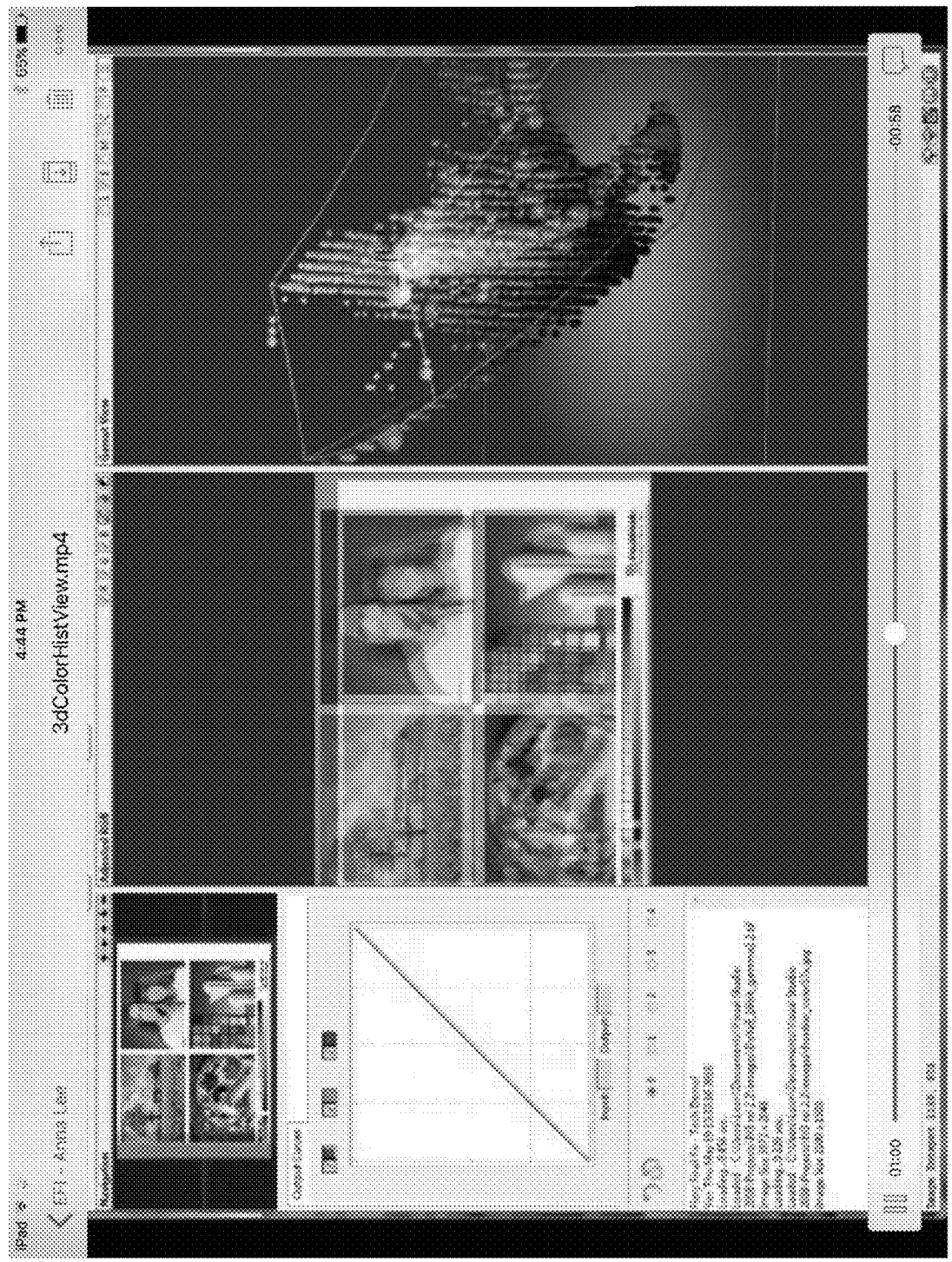
Figure 35:
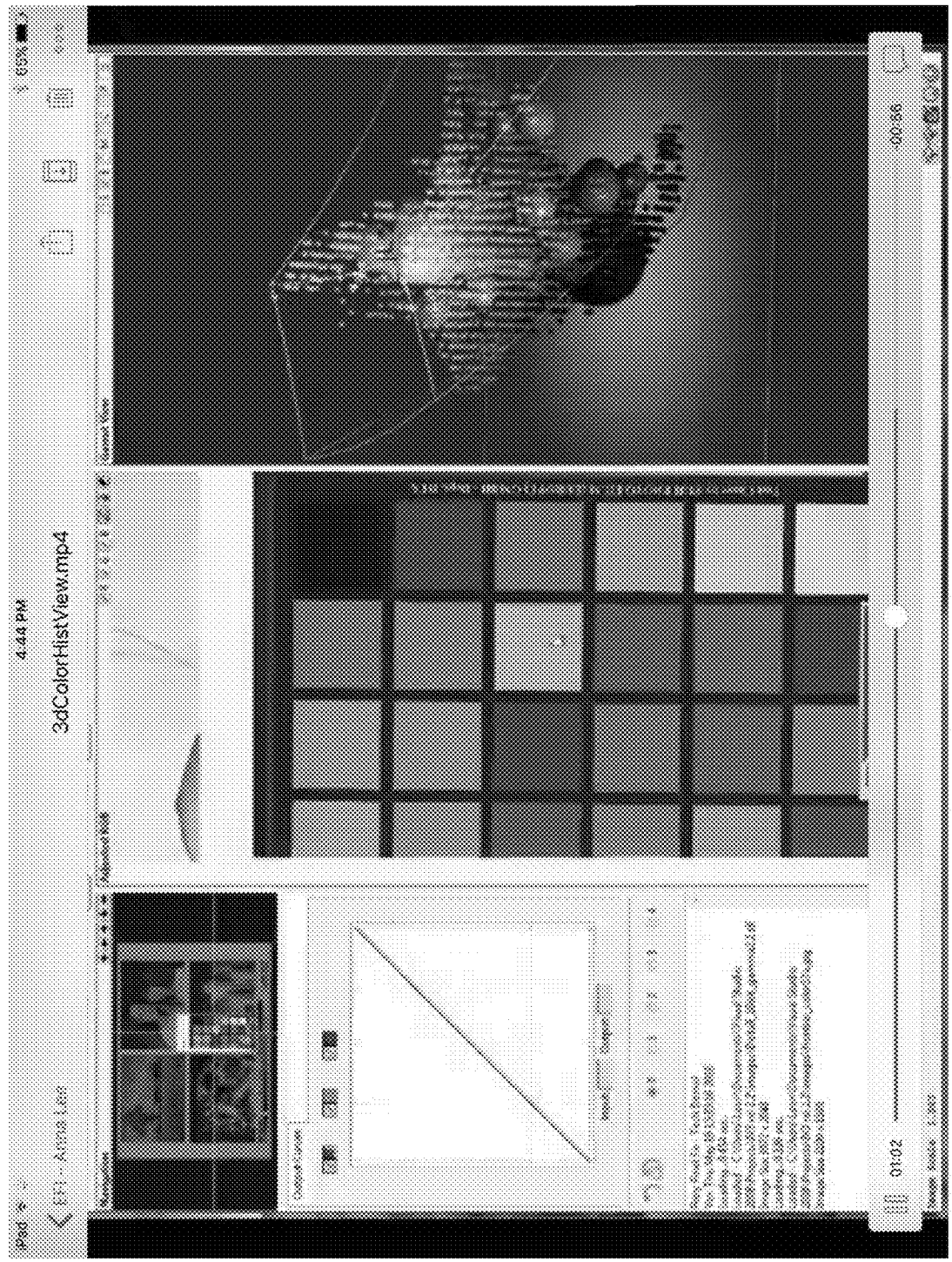
FIG. 35-39 illustrate how the gamut of colors represented in an interactive 3D histogram can vary as the individual views different segments of a digital image.
Figure 36:
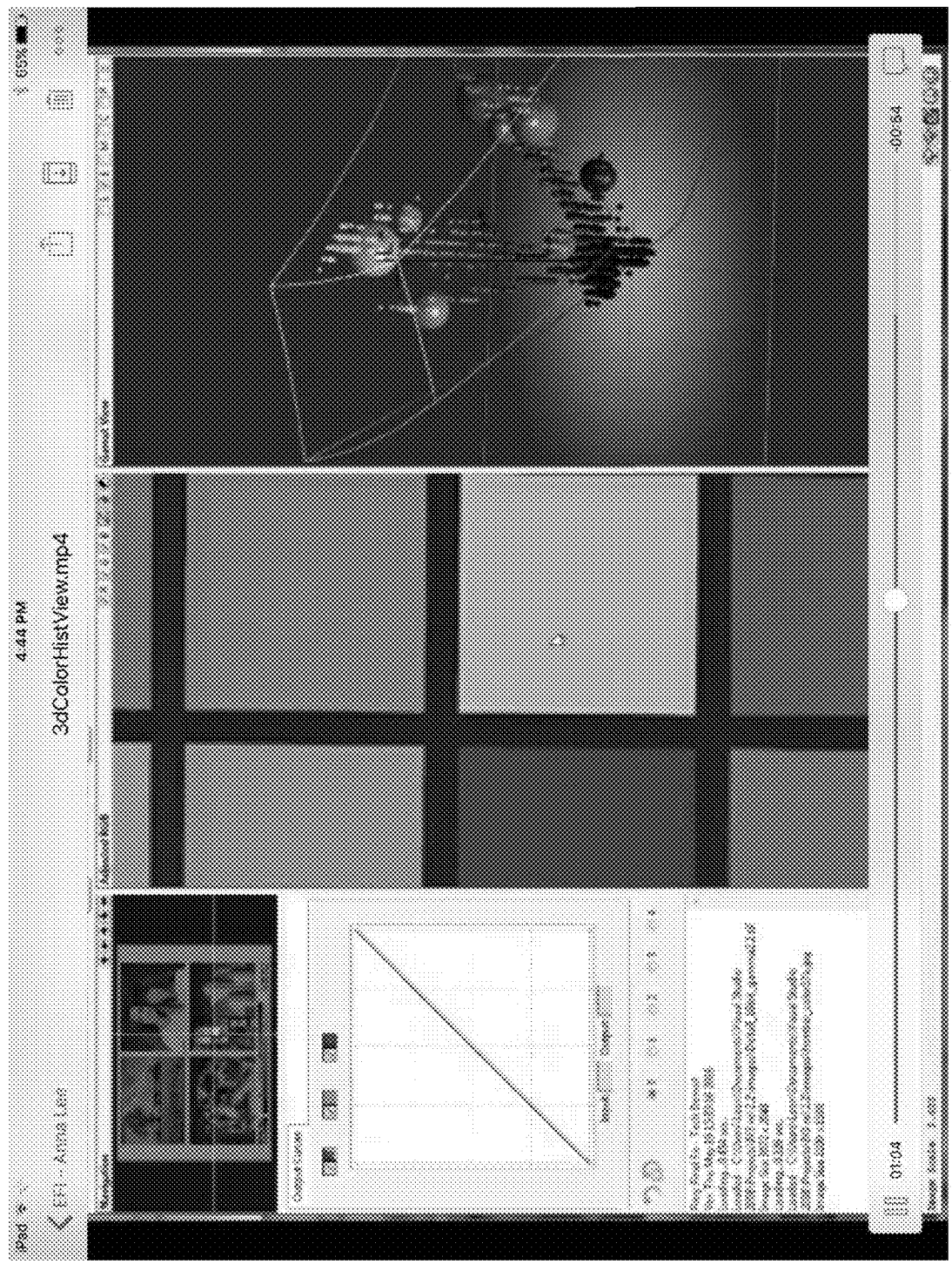
Figure 37:
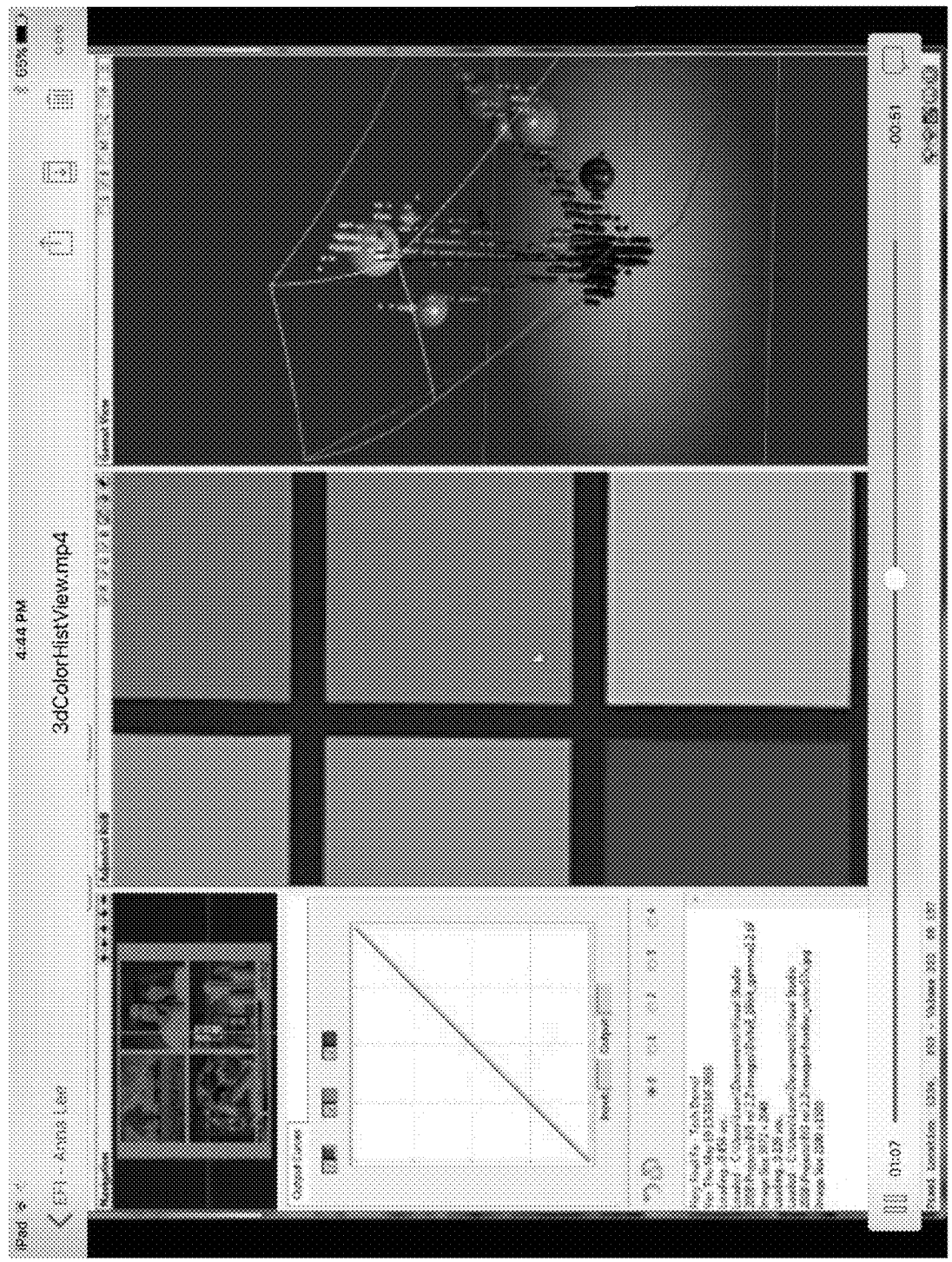
Figure 38:
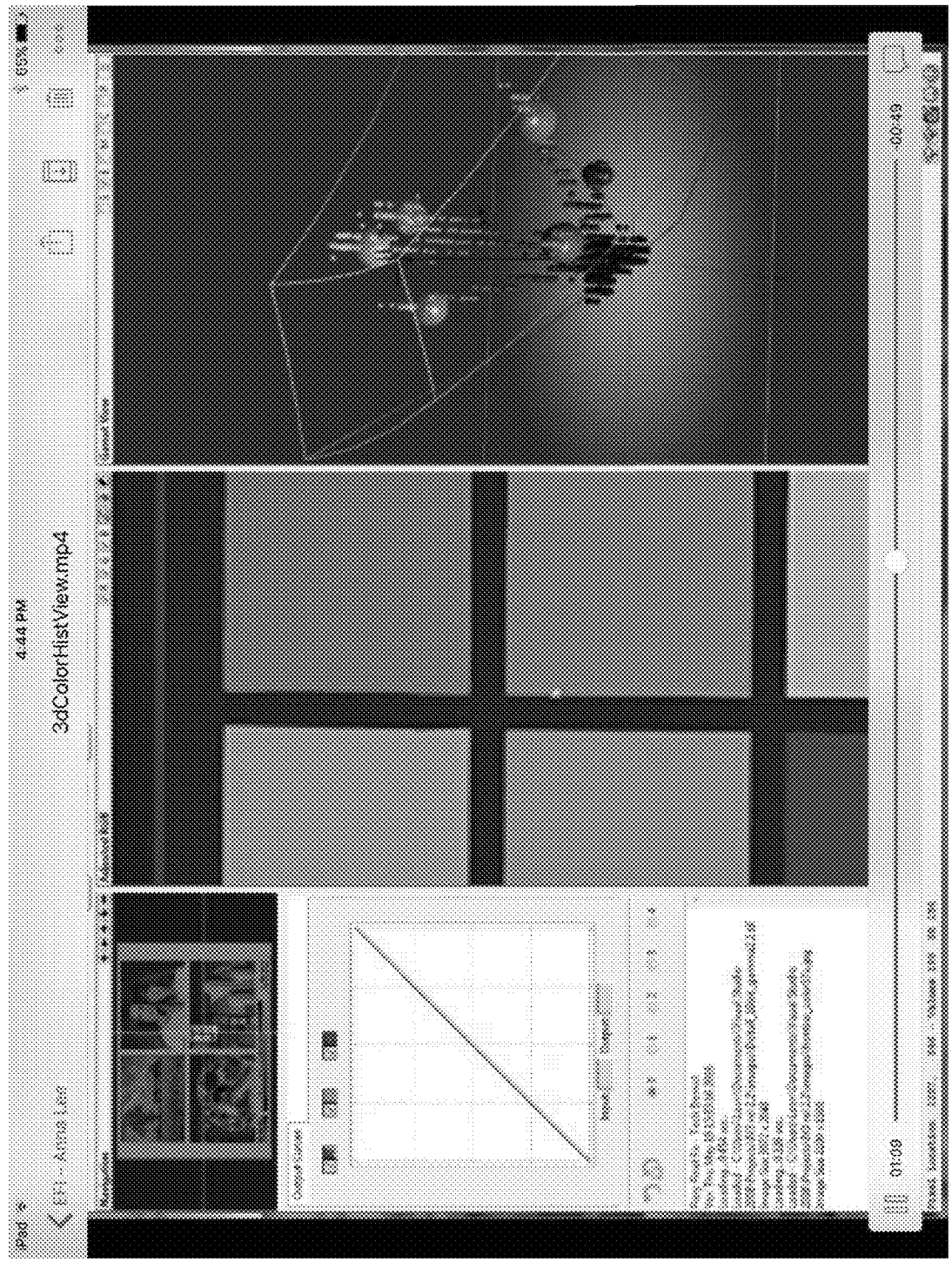
Figure 39:
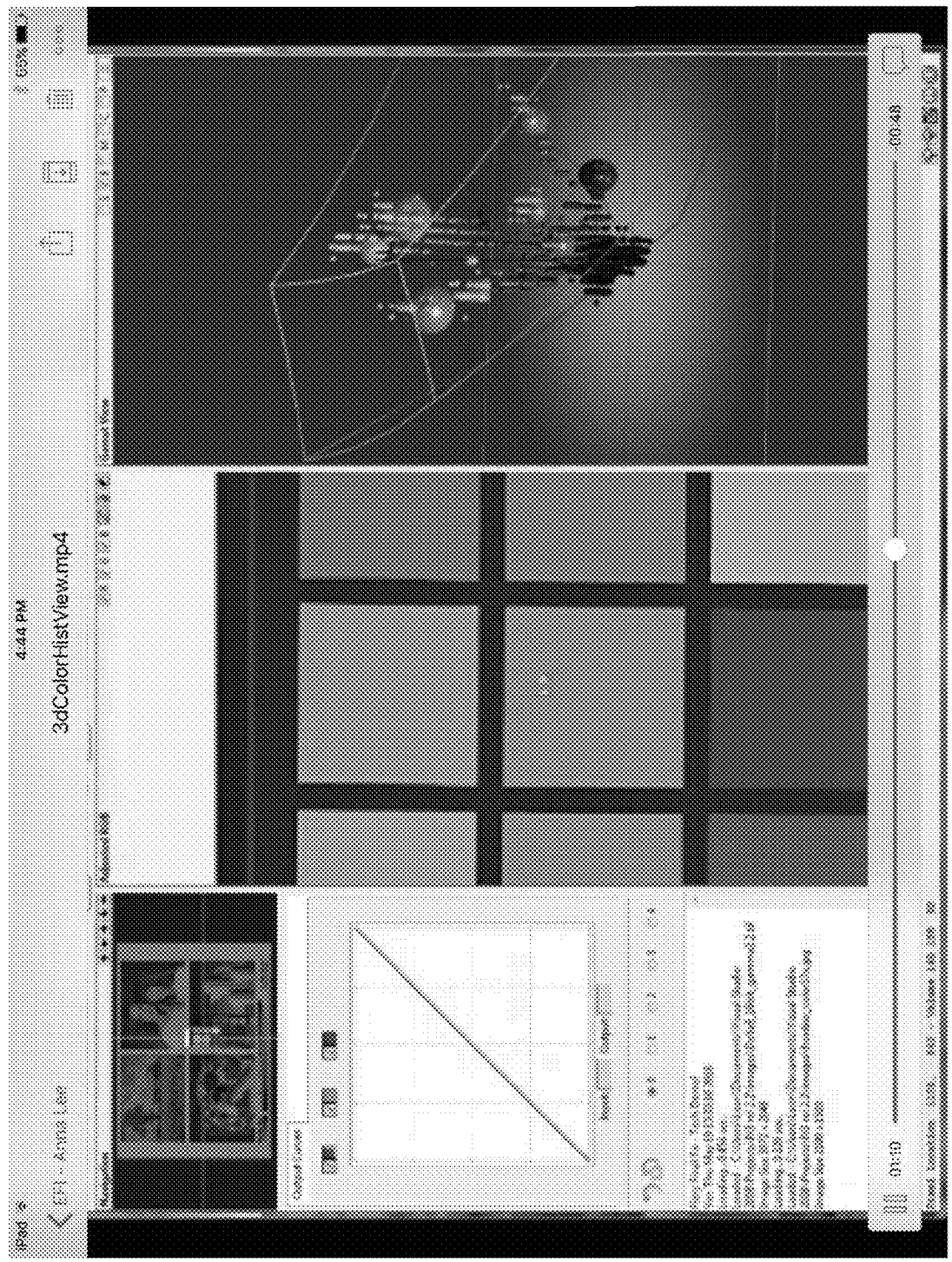
Figure 40:
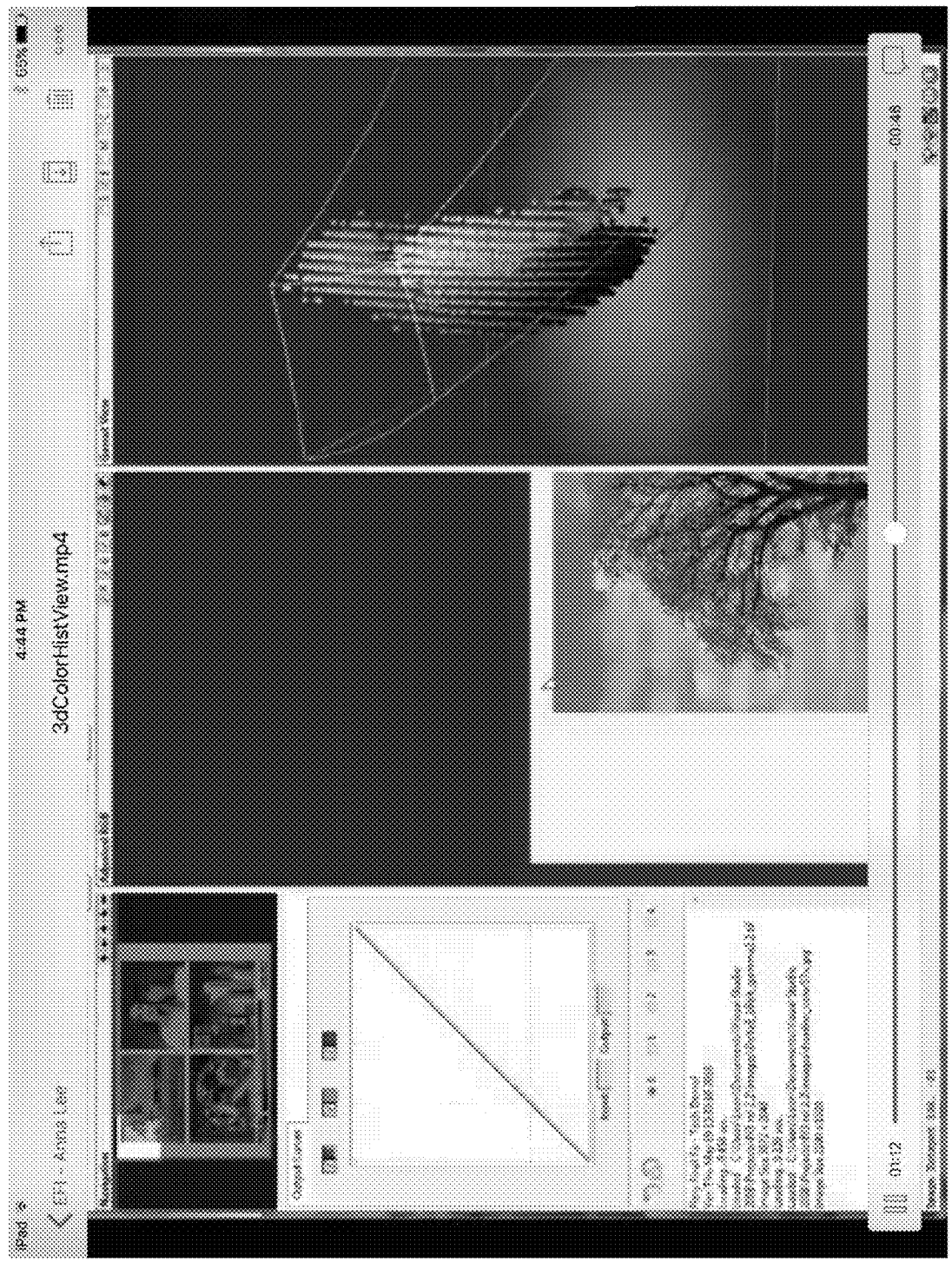
FIGS. 40-45 illustrate how the gamut of colors represented in an interactive 3D histogram can vary as the individual views different segments of another digital image.
Figure 41:
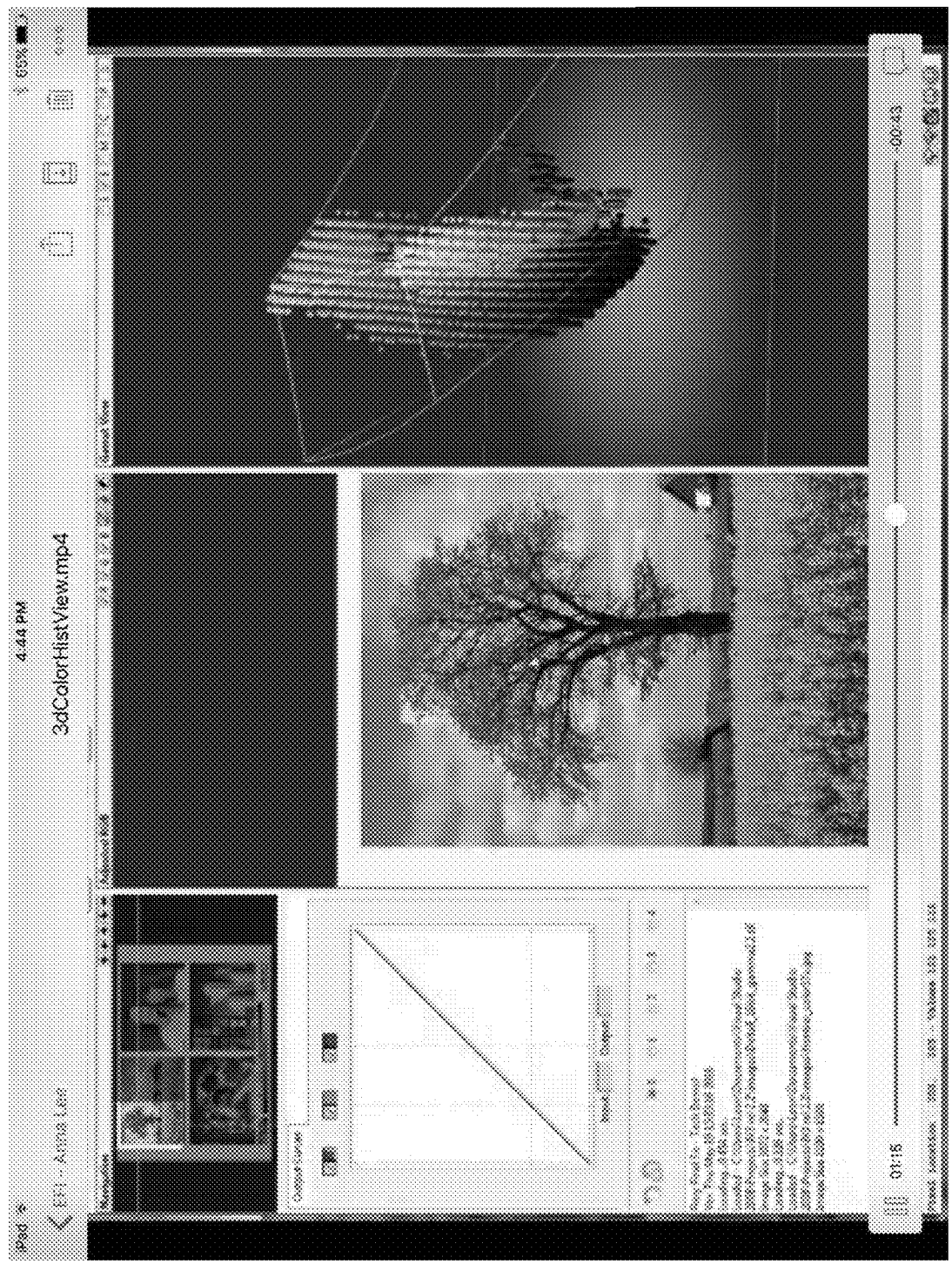
Figure 42:
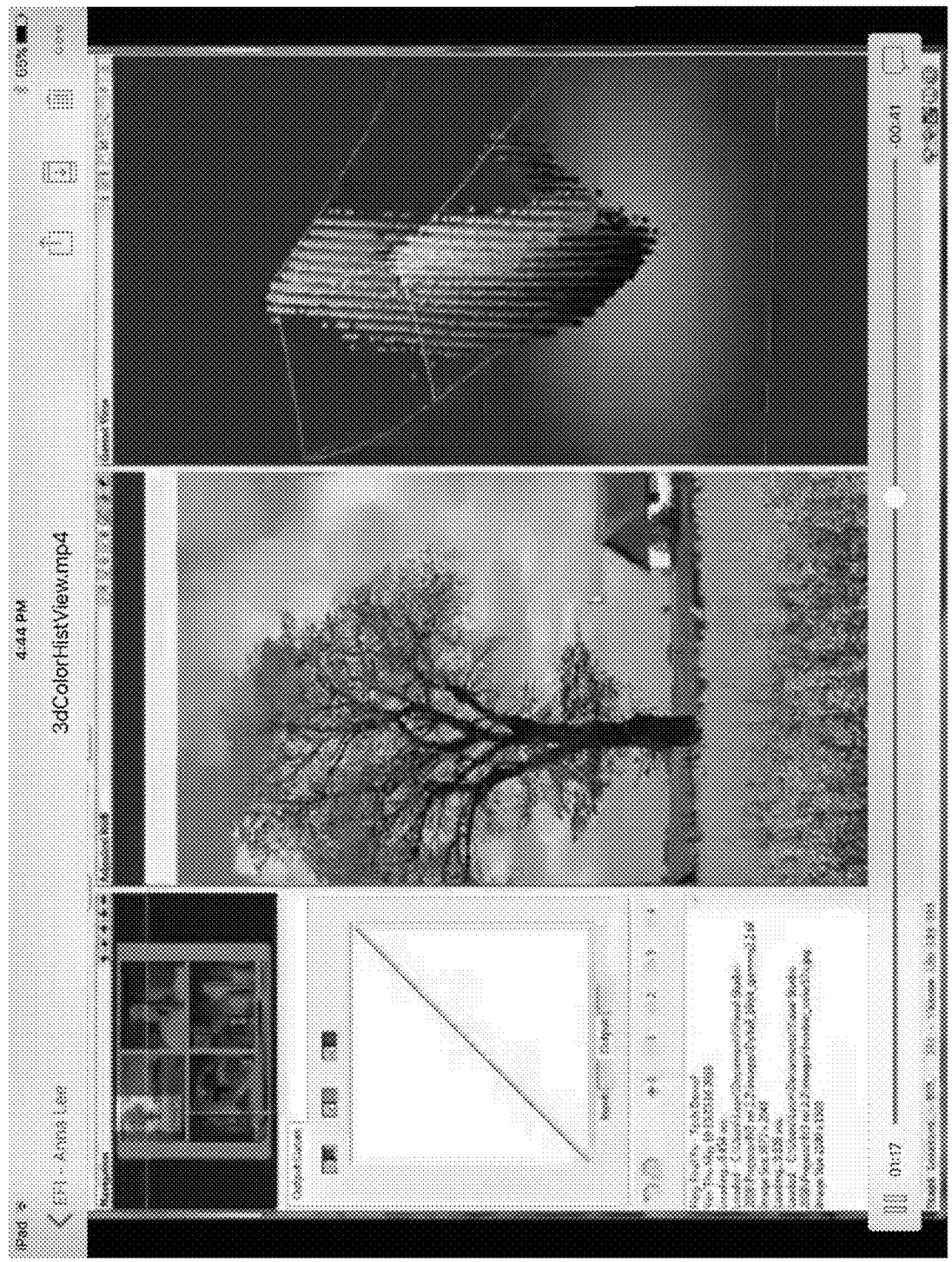
Figure 43:
Figure 44:
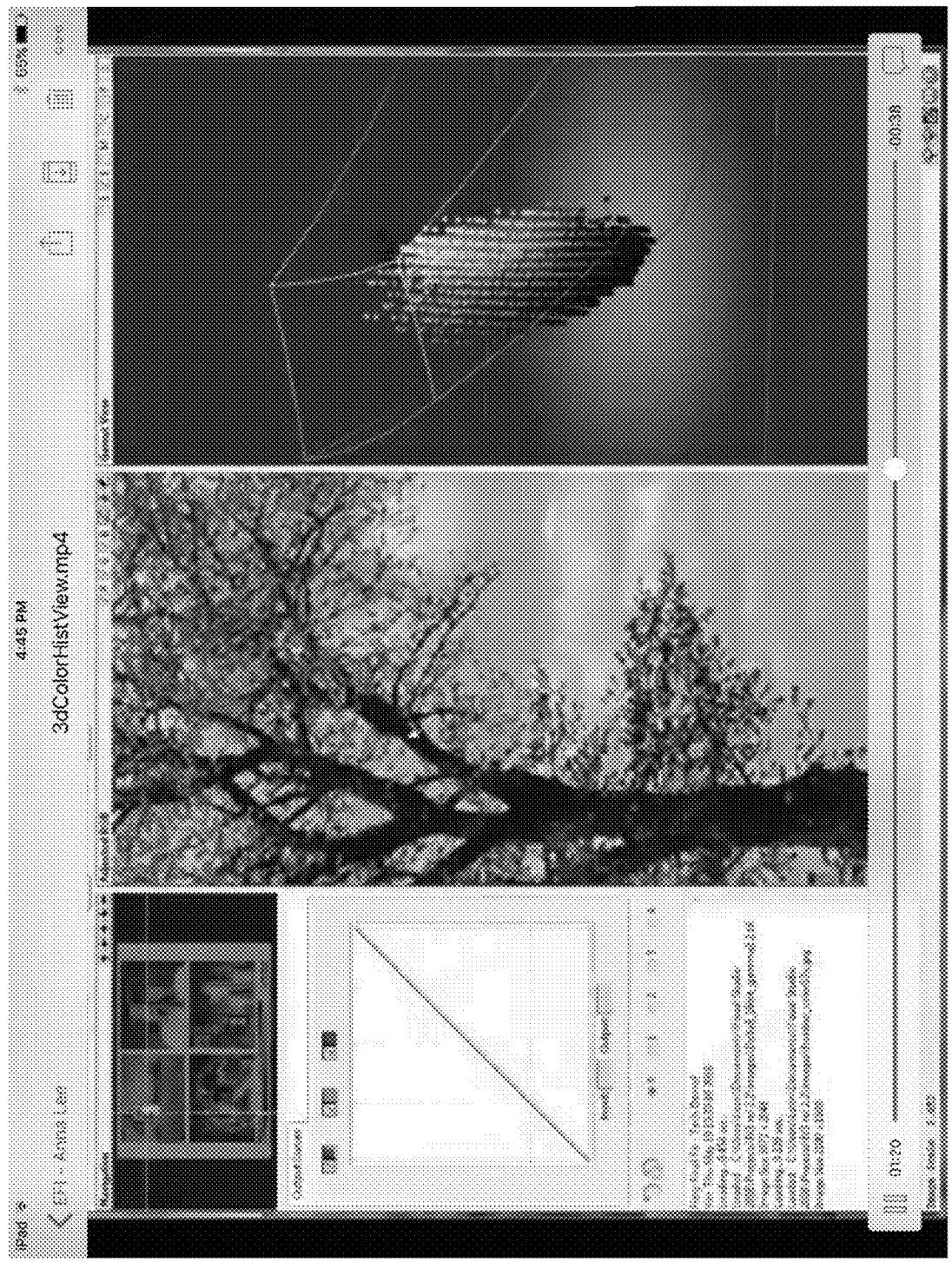
Figure 45:
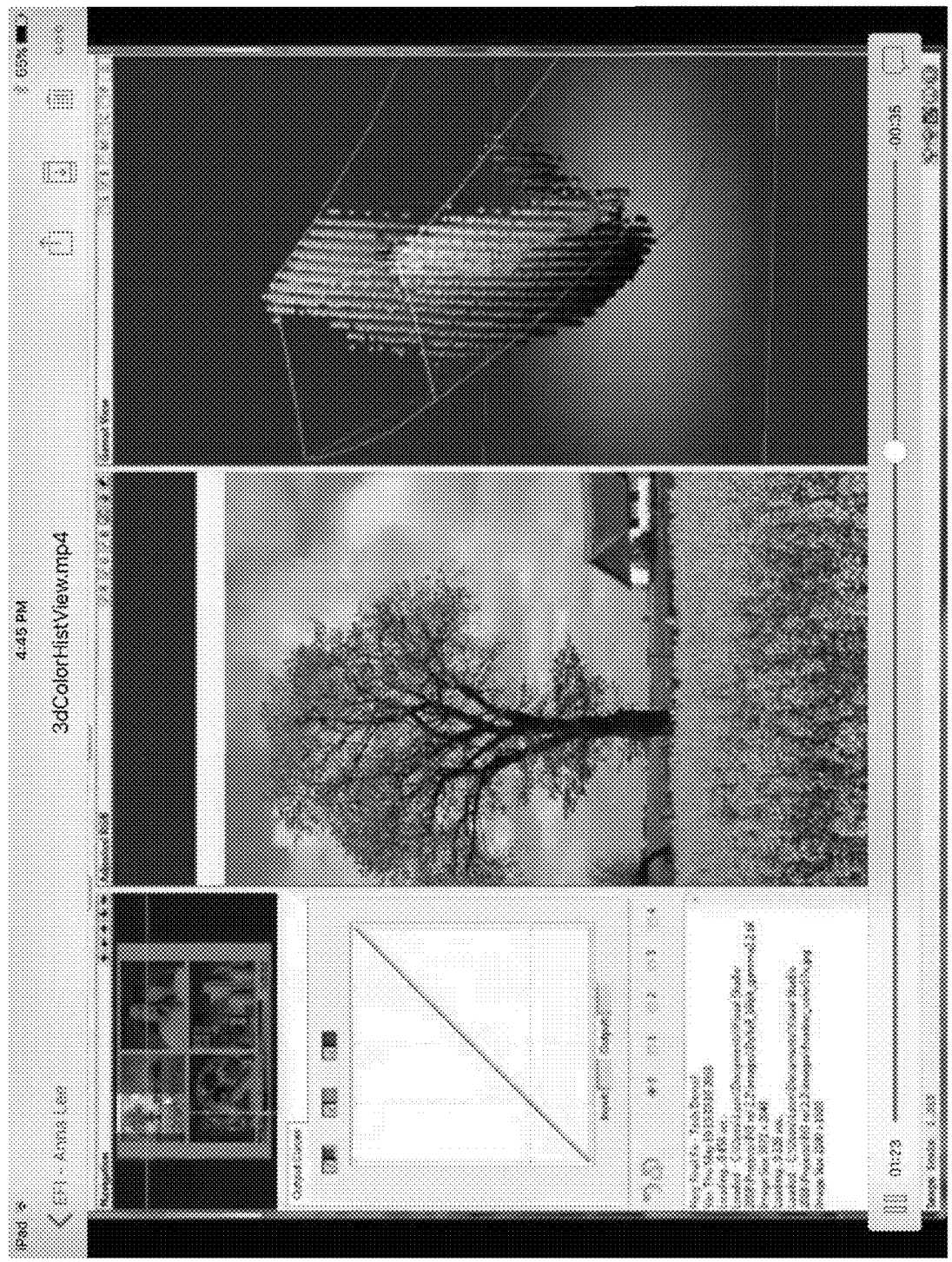
Figure 46:
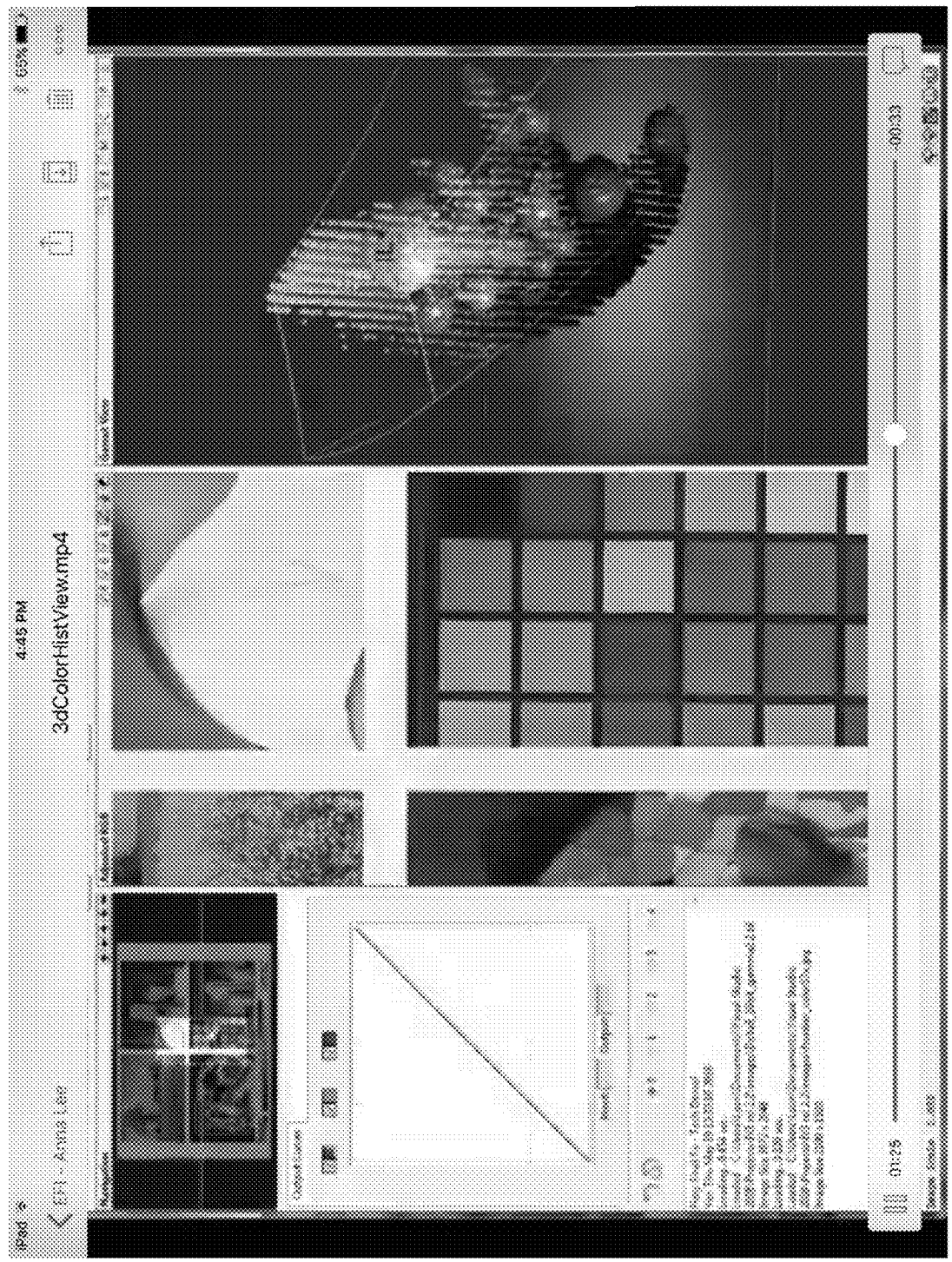
FIGS. 46-57 illustrate how the user interface may also be used to simultaneously view multiple digital images, which could be collectively represented in a single histogram or individually represented in dedicated histograms.
Figure 47:
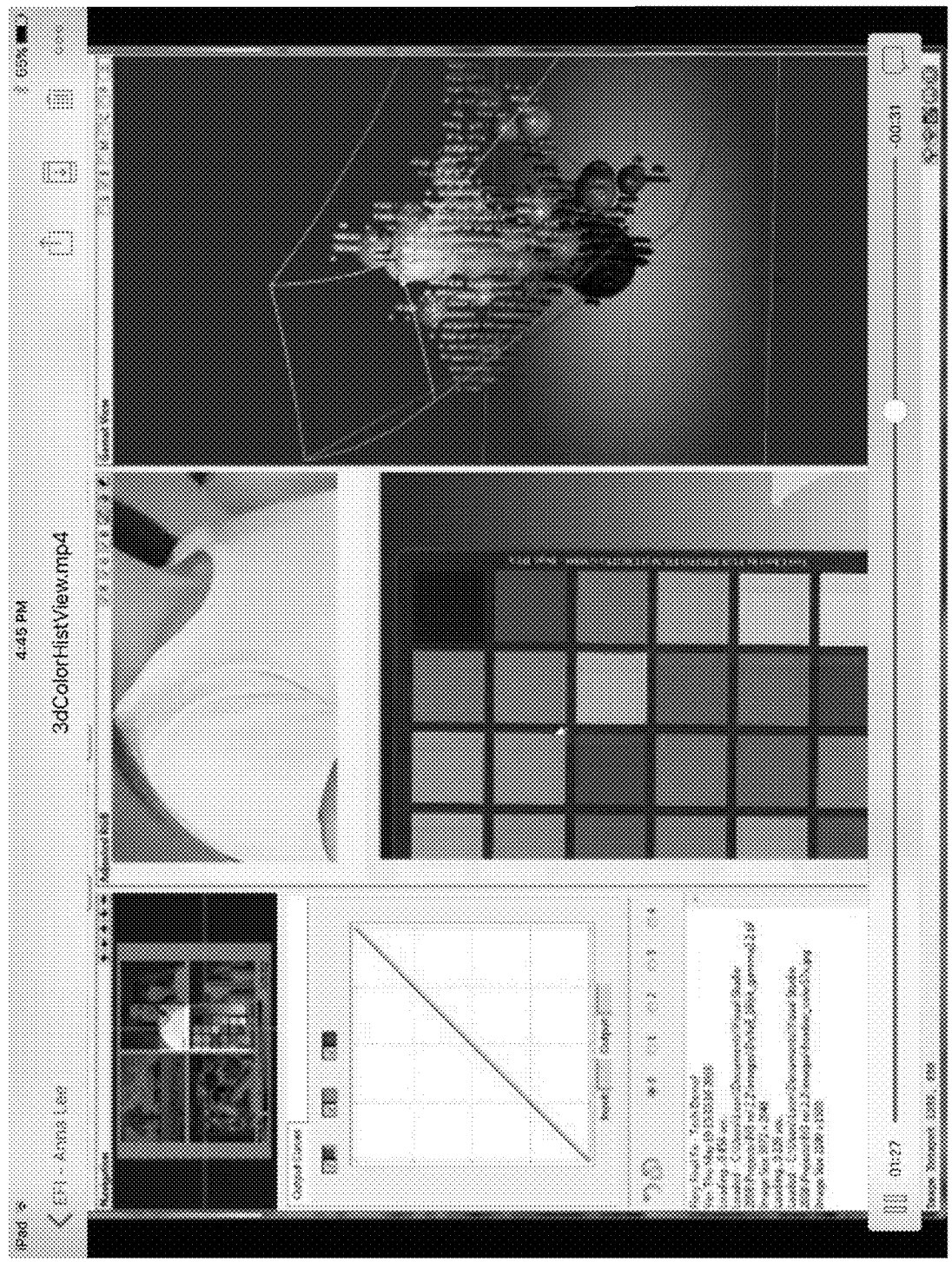
Figure 48:
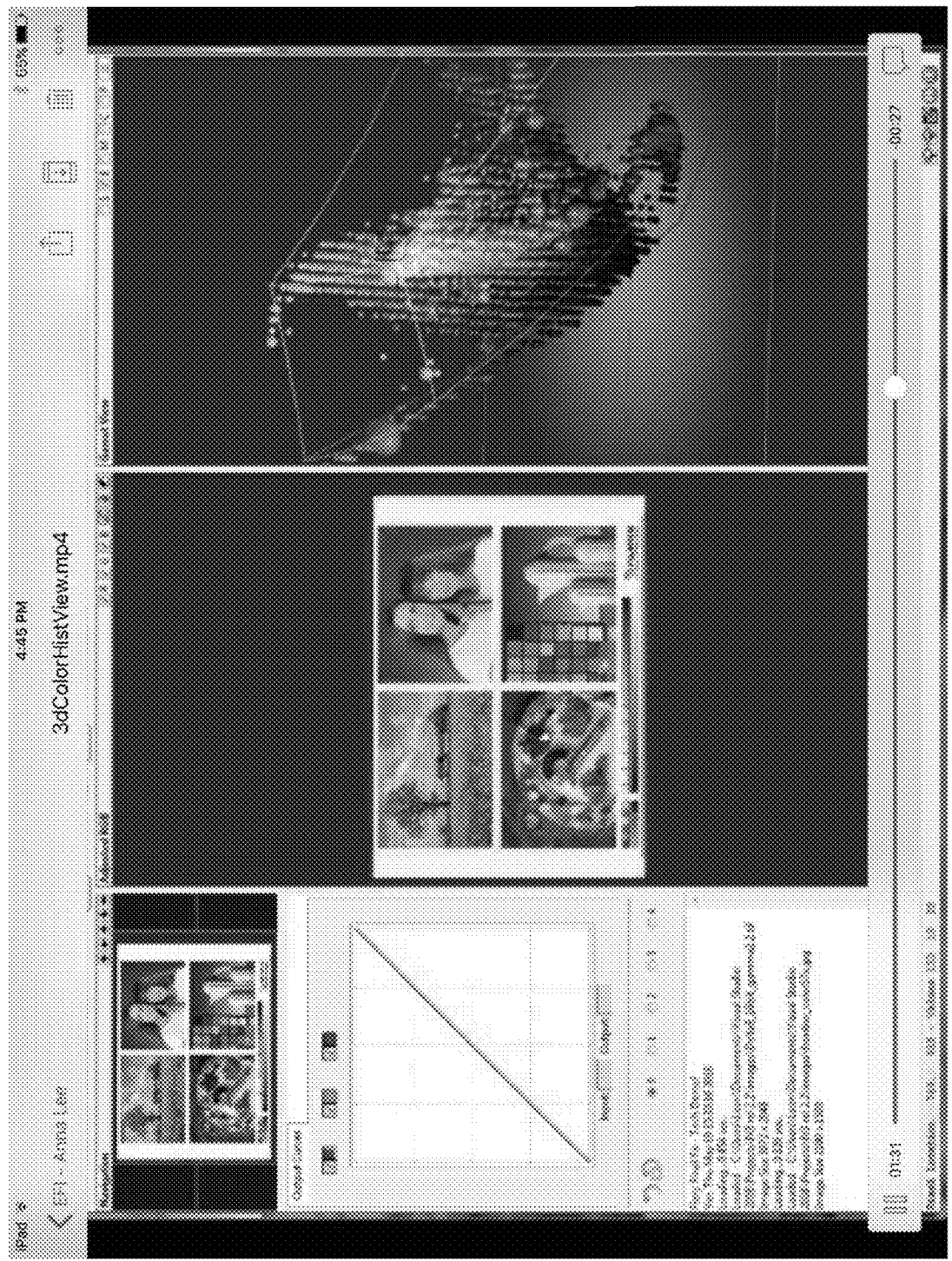
Figure 49:
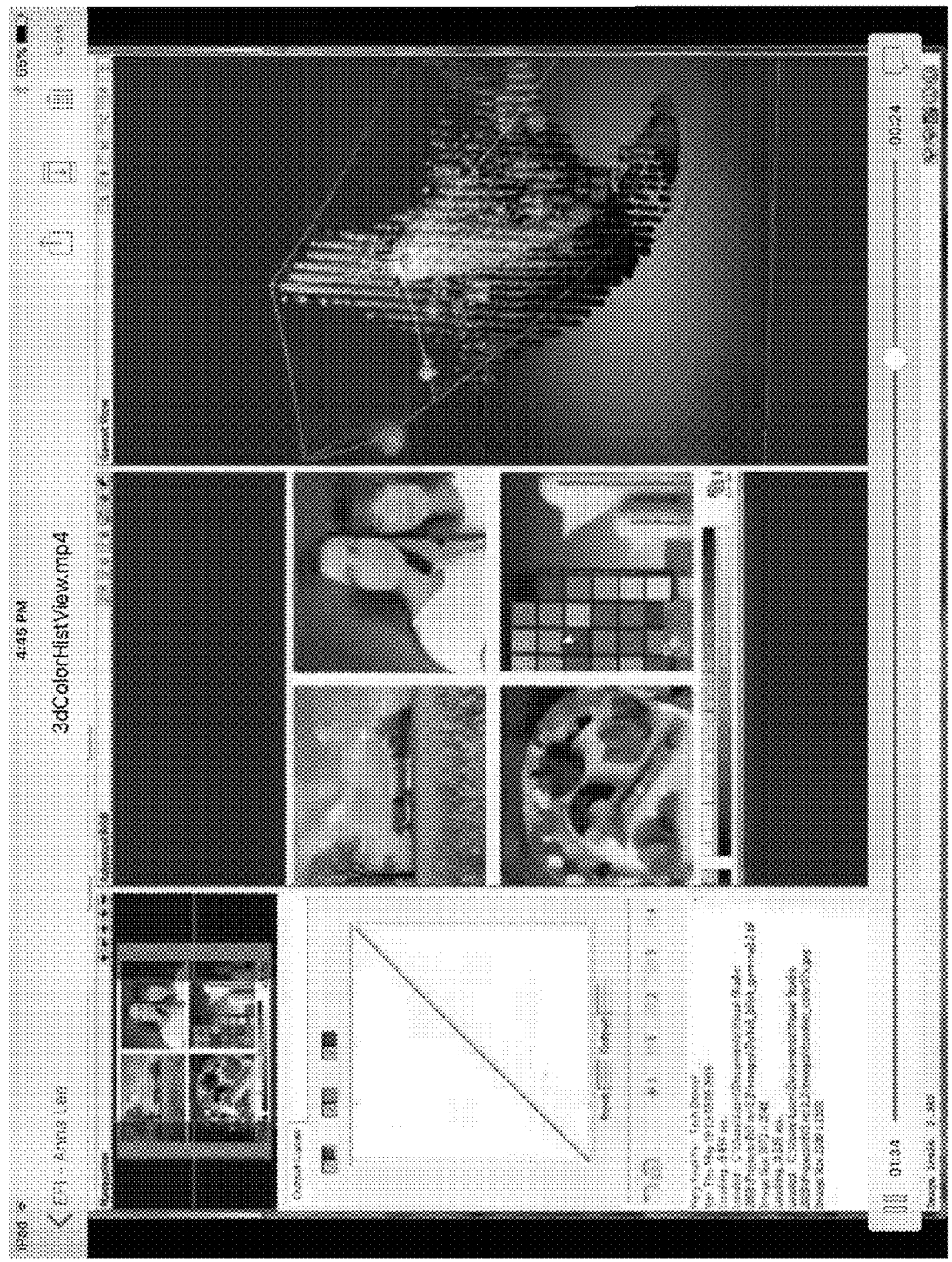
Figure 50:
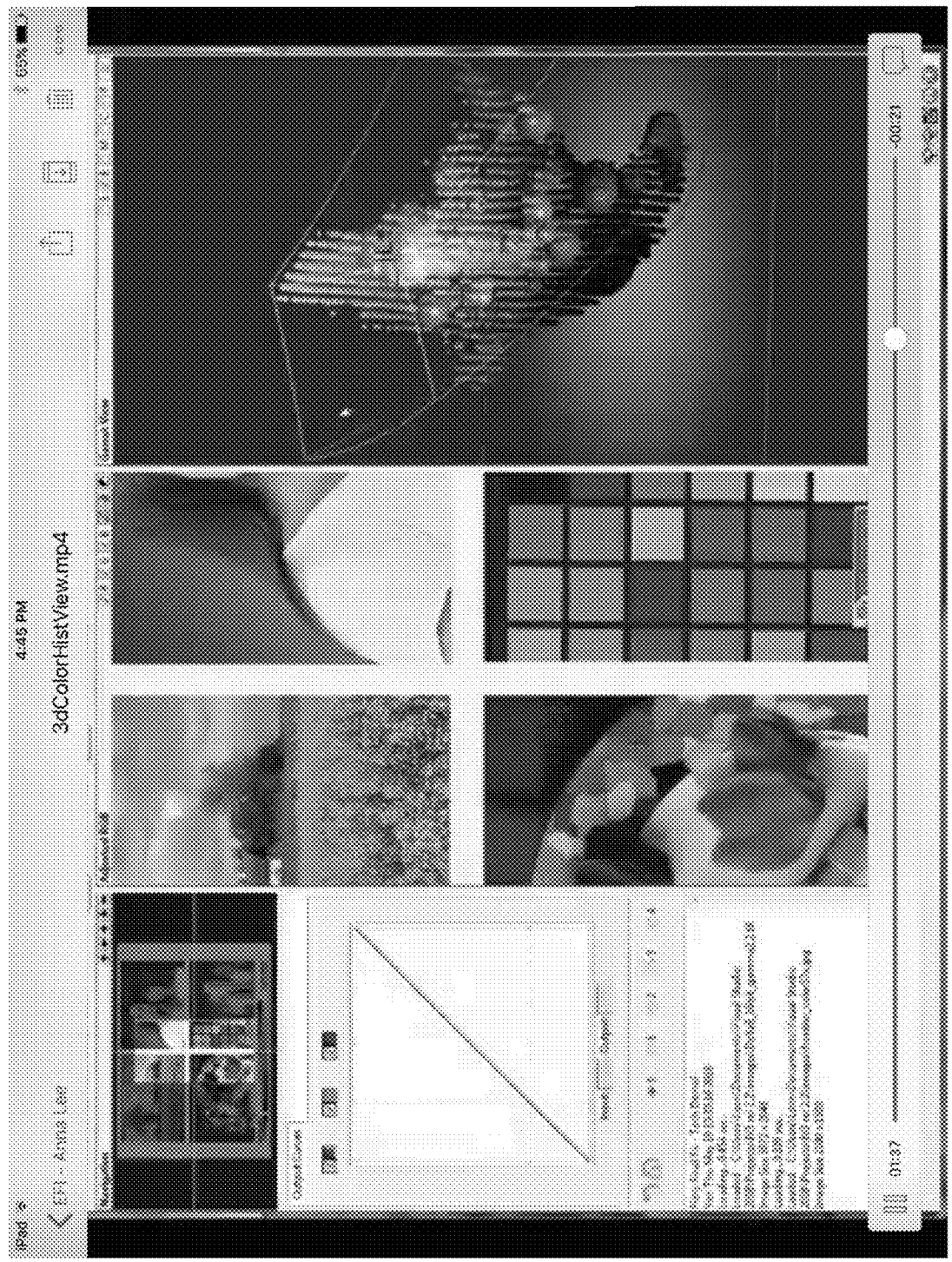
Figure 51:
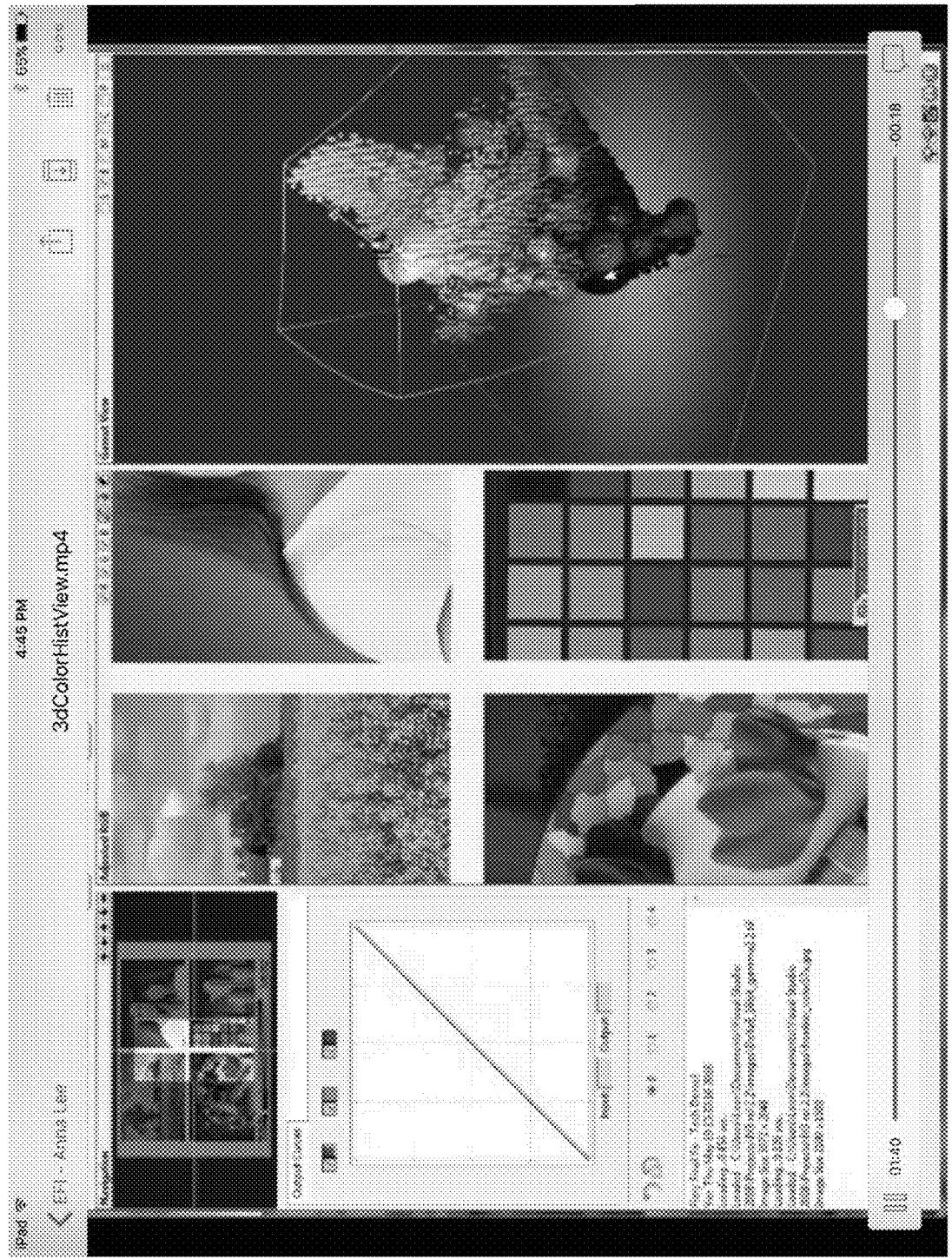
Figure 52:
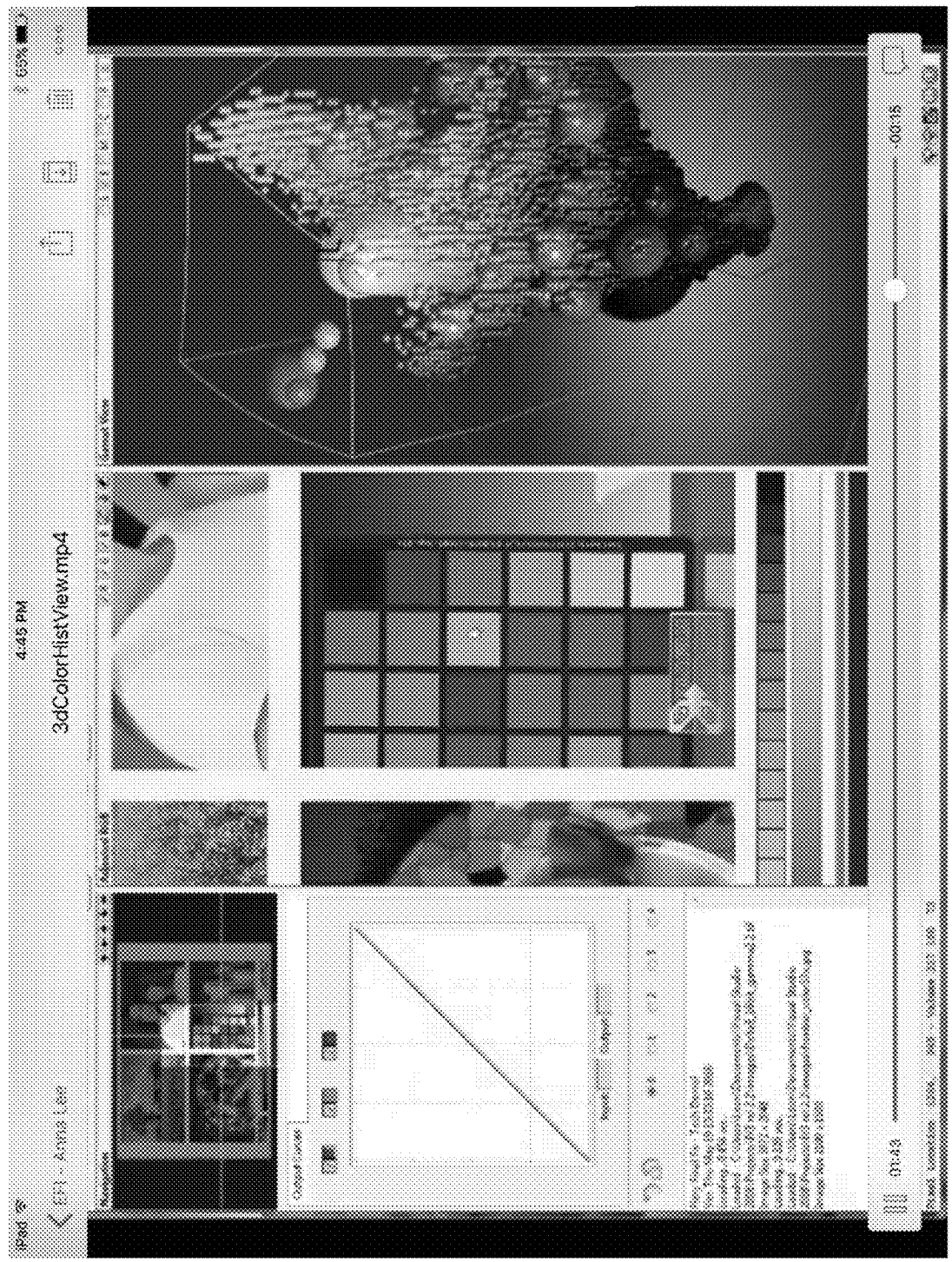
Figure 53:
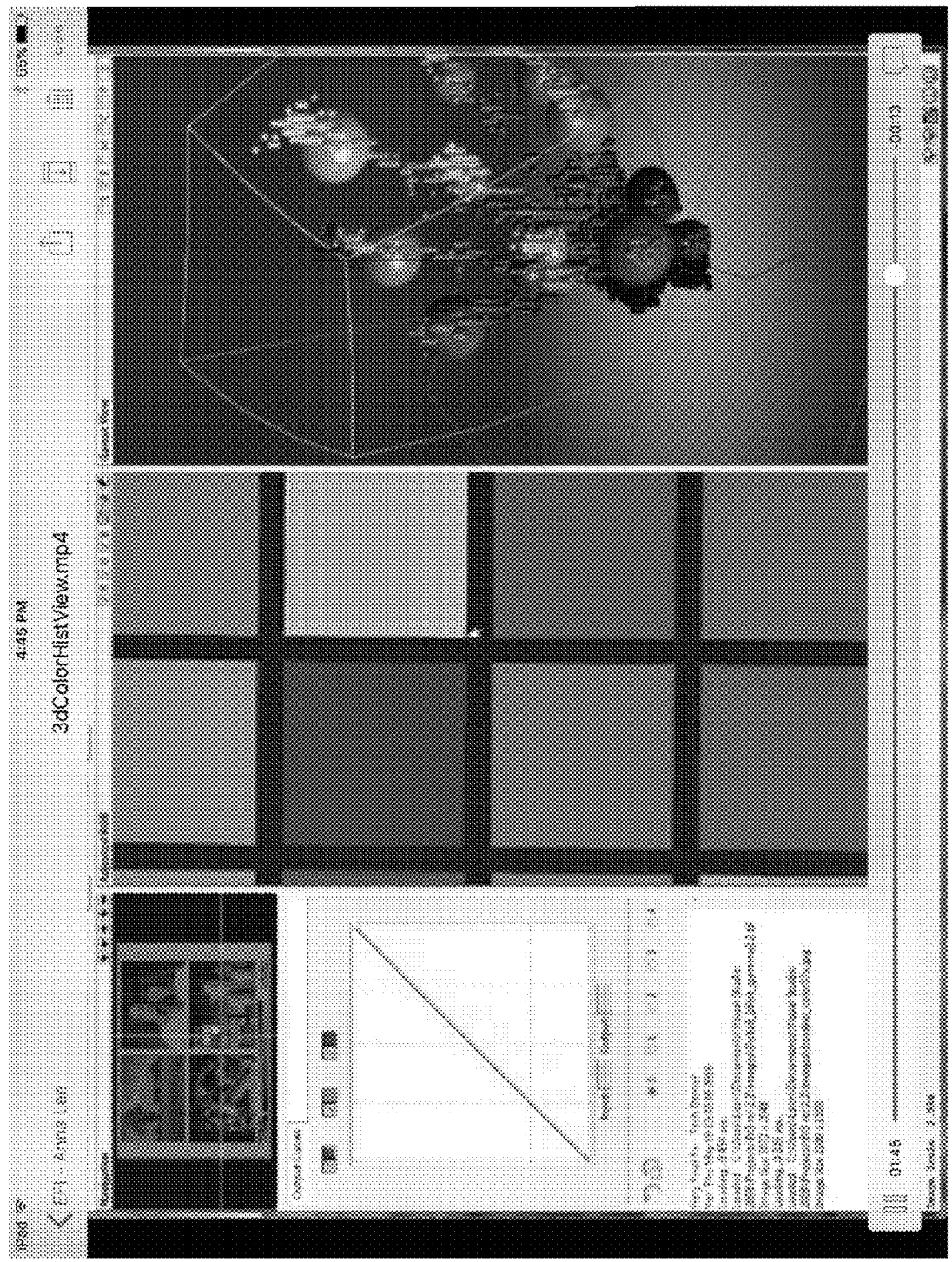
Figure 54:
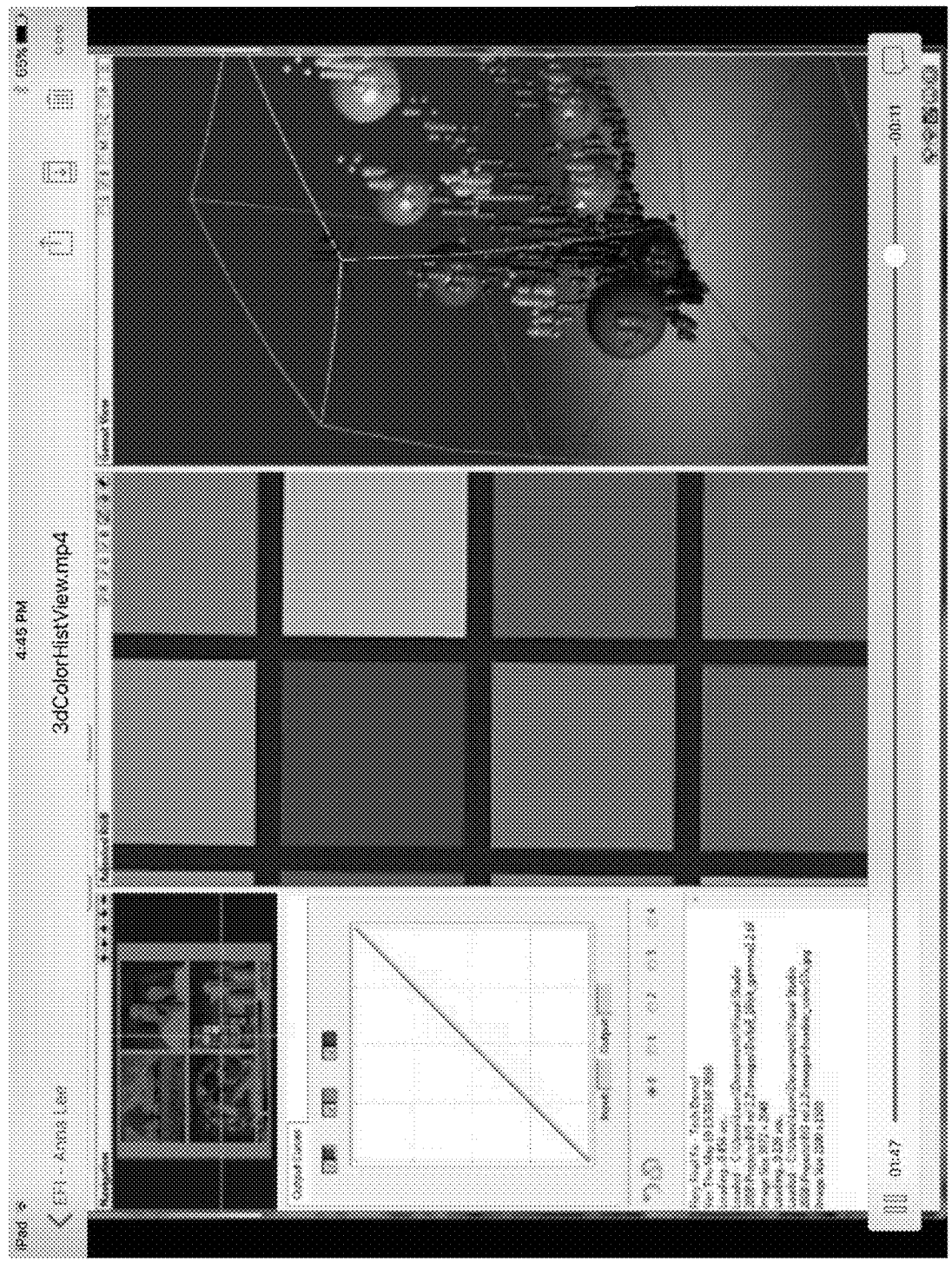
Figure 55:
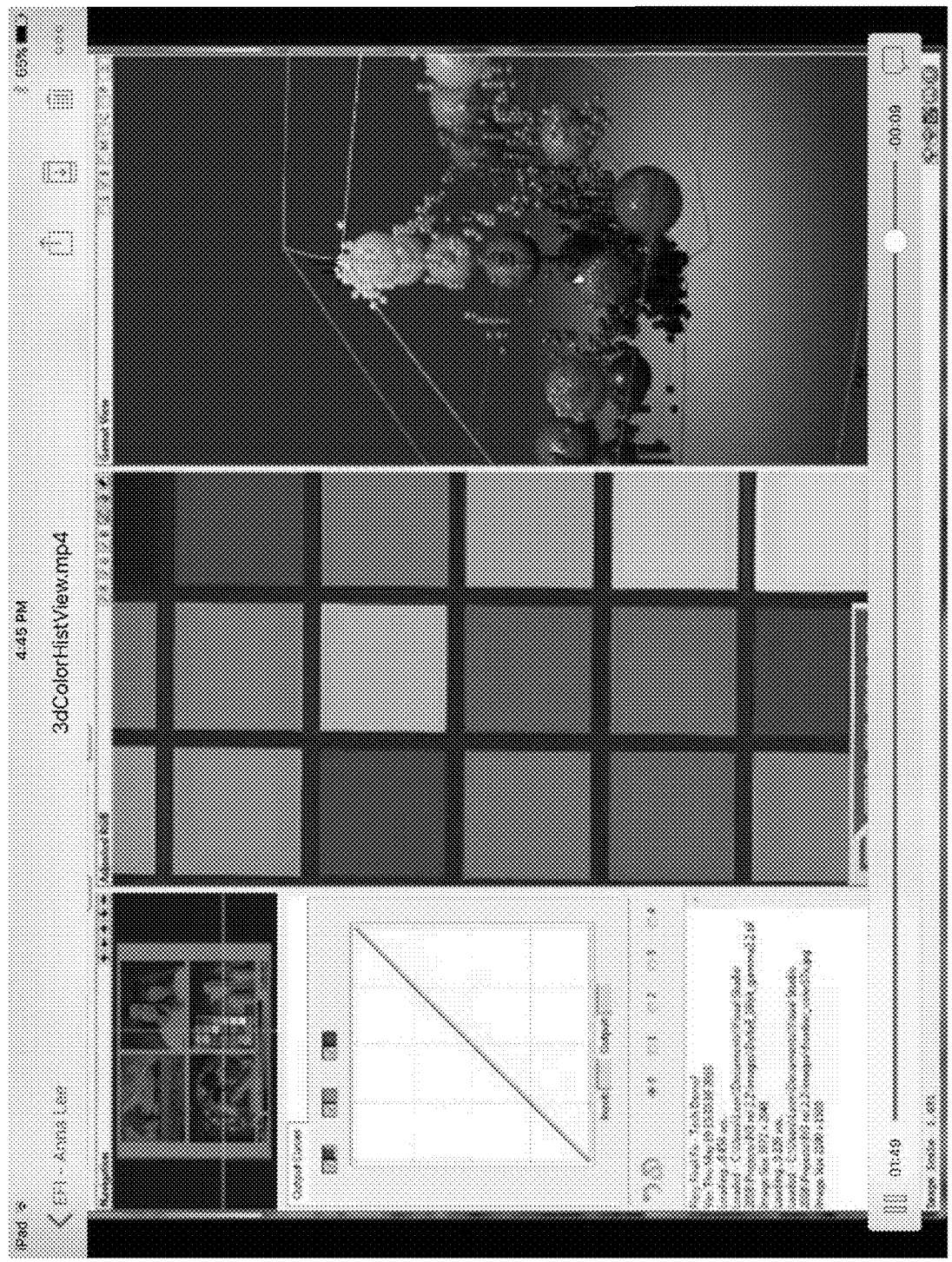
Figure 56:
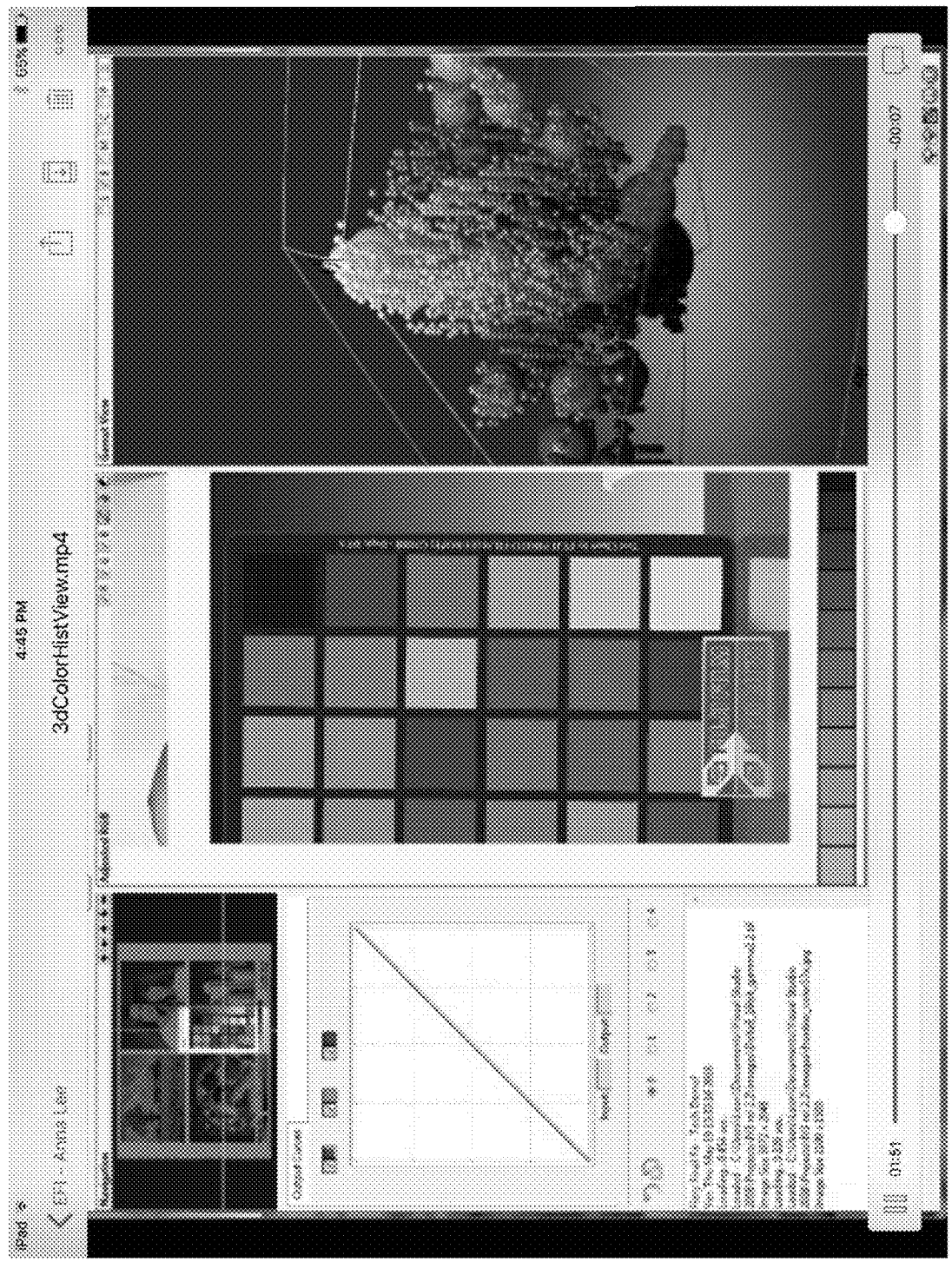
Figure 57:
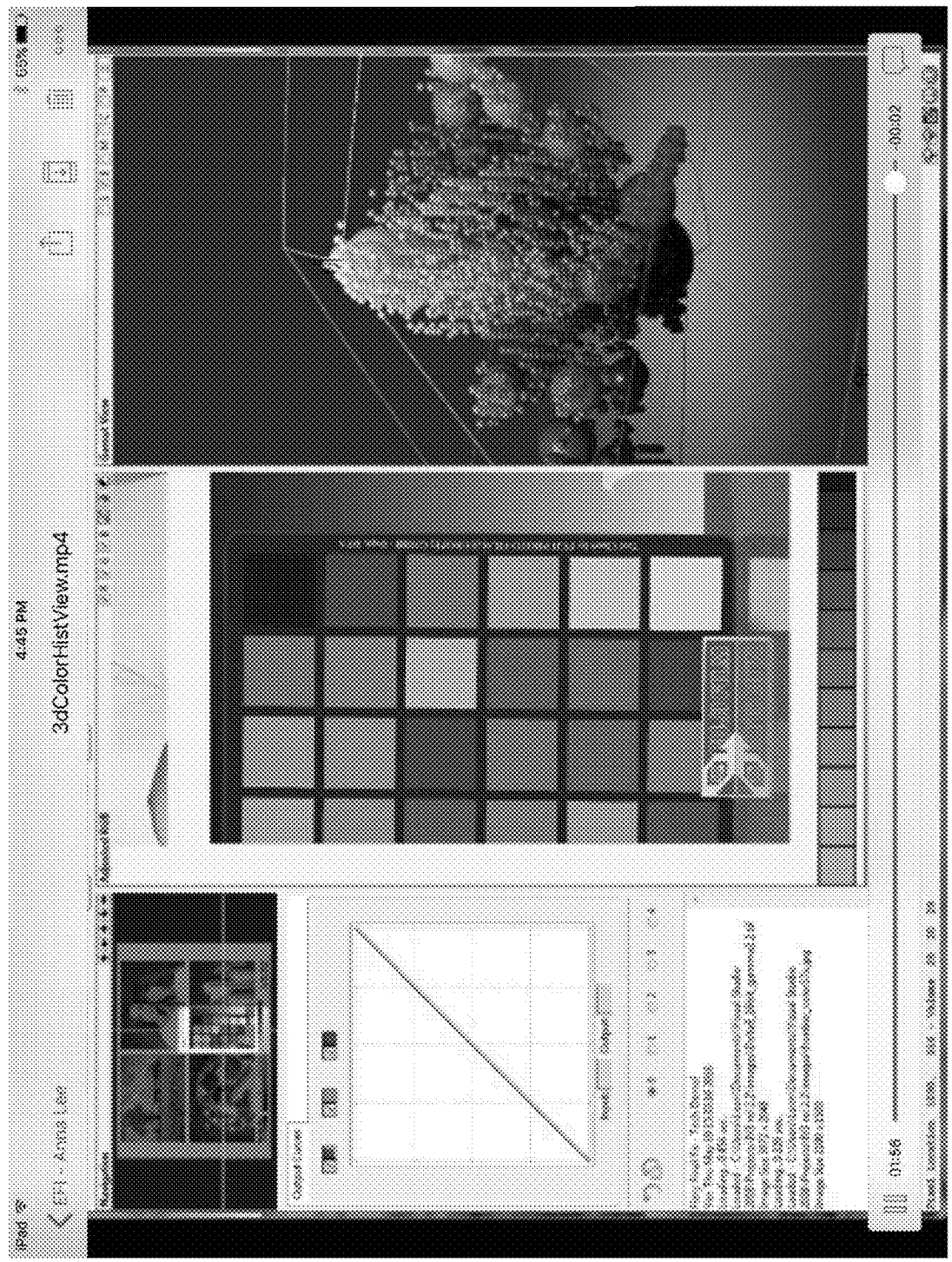

FIG. 6 illustrates an interactive 3D histogram that uses spheres shaded with specular highlights and ambient lighting shadows. Such characteristics allow the markers to be easily identified at a glance.

However, in some instances rendering thousands of shaded spheres is too computationally intensive to be efficient for visualization. Accordingly, a processing system may cause a GPU to implement a technique called "impostor spheres" to address this issue. Such a technique enables the GPU to draw squares (which are less computationally intensive to produce), and then use fragment shaders to disguise the corners that do not form part of the spheres.

For example, a simple 2D digital image could be referenced that displays specular highlights and ambient lighting that is common to each marker. The orientation of some or all of the markers can be adjusted so that the 2D digital image plane is always perpendicular to the camera (i.e., an individual's viewpoint) as the digital image is rotated, The size of the 2D digital image may be scaled to represent the histogram bin count. Finally, color can be added to the shaded marker(s) so that most of each sphere is the correct color, but the highlight/shadow provided by the common marker makes it appear as a sphere that is the correct color and easily identified relative to its neighbors. The marker ventex shader technique can be implemented using the following GLSL code:

```
// Input vertex data
attribute vec4 vertexPosition;
attribute vec4 vertexColor;
// Output data that will be interpolated for each fragment
varying vec4 vColor;
varying float vRadius;
void main( ) {
    // This is a pass-through vertex shader
    // Send the model space coordinates to the geometry
        shader
    g1_Position=vec4(vertexPosition.xyz, 1.0);
    vColor=vertexColor;
    vRadius=vertexPosition[3]+1.0;
}
```

The following GLSL code illustrates how the image can be kept perpendicular to the camera (i.e., an individual's viewpoint:

```
// Geometry shader for image histogram display
// Convert vertex position to texture coordinates for an
    impostor sphere
layout(points) in;
layout(triangle_strip, max_vertices=4) out;
// Output from vertex shader for each vertex (marker)
in vec4 vColor[ ];
in float vRadius[ ];
// Values that stay constant for the whole mesh
uniform mat4 uPMatrix;
uniform mat4 uMVMatrix;
uniform vec3 upVector;
uniform vec3 camera;
// Color and coordinates for billboard texture
out vec2 ftexoords;
out vec4 markerColor;
void issue(vec4 center, vec2 texcoord, vec3 offset) {
    ftexcoords=texcoord; // Texture corner (u.v)
    markerColor=vColor[0]; // Color for marker (constant)
    // Corner position scaled for marker size
    Center.xyz+=offset*vRadius[0];
```

```
// Apply projection and model view
gl_Position=uPMatrix*uMVMatrix*center;
EmitVertex( ); // Triangle strip coordinate out
}
void main( ) {
// Point camera vector
vec3 look=normalize(gl_in[0].gl_Position.xyz-camera);
vec3 r=cross(normalize(upVector), look);
// Right-left/right corners perpendicular to camera
vec3 u=cross(look, r);
// Up-top/bottom corners perpendicular to camera
issue(gl_in[0].gl_Position, vec2(1.0, 1.0), -u-r); // Bottom-left
issue(gl_in[0].gl_Position, vec2(0.0, 1.0), -u+r); // Bottom-right
issue(gl_in[0].gl_Position, vec2(1.0, 0.0), u-r); // Top-left
issue(gl_in[0].gl_Position, vec2(0.0, 0.0), u+r); // Top-right
EndPrimitive( );
}
```

Finally, the following GLSL code can be used to apply highlights/shadows to color:

```
layout(location=0) out vec4 frag_color;
// Values that stay constant for the whole mesh
uniform sampler2D marker;
in vec2 ftexcoords;
in vec4 markerColor;
void main( ) {
// Texture has simulated shading of sphere
vec4 texel=texture(marker, ftexcoords);
// Don't write if alpha zero, corrupts depth plane
if (texel.a==0)
    discard;
// Texture is mostly 128 to pass color untouched (hence -0.5)
// Values>128 apply specular highlights
// Values<128 apply ambient shadows
frag_color.rgb=markerColor.rgb+texel.rgb-0.5;
frag_color.a=texel.a;
}
```

FIGS. 7-57 include various examples of user interfaces that include digital images, interactive 3D histograms, etc.

Remarks

The above description of various embodiments has been provided for the purposes of illustration and description. It is not intended to be exhaustive or to limit the claimed subject matter to the precise forms disclosed. Many modifications and variations will be apparent to one skilled in the art. One skilled in the relevant technology will also understand that some of the embodiments may include other features that are not described in detail herein. Some well-known structures or functions may not be shown or described in detail below, to avoid unnecessarily obscuring the relevant descriptions of the various examples.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

We claim:

1. A non-transitory medium with instructions stored thereon, that when executed by a processing system, cause the processing system to perform operations comprising:
   acquiring a first digital image that is in a first color space;
   transforming the first color space to a second color space, so as to produce a second digital image from the first digital image;
   transforming the second color space to the first color space, so as to produce a third digital image from the second digital image; and
   determining whether a printer that is configured to print in the second color space will experience a gamut limitation by—
       comparing, for each color value of a series of color values, a number of occurrences in the first digital image to a number of occurrences in the third digital image, and
       identifying a color value for which there are occurrences in the first digital image but not the third digital image and that is representative of the gamut limitation.

2. The non-transitory medium of claim 1, wherein the processing system is part of the printer.

3. The non-transitory medium of claim 1, wherein the operations further comprise:
   binning color values included in the first and third digital images by—
       dividing the first color space into a series of bins that correspond to the series of color values,
       establishing a count for each bin of the series of bins by counting occurrences of each color value in the series of color values in the first digital image, and
       establishing a count for each bin of the series of bins by counting occurrences of each color value in the series of color values in the third digital image.

4. A method for establishing whether a printer will experience gamut limitations, the method comprising:
   receiving input that is indicative of a request to print a first digital image in a first color space using the printer that is able to print in a second color space;
   transforming (i) the first color space to the second color space and then (ii) the second color space to the first color space, so as to produce, based on the first digital image, a second digital image that is also in the first color space; and
   determining whether the printer will experience a gamut limitation by— comparing, for each color value of a series of color values, a number of occurrences in the first digital image to a number of occurrences in the second digital image, and identifying color values, if any, for which there are occurrences in the first digital image but not the second digital image, and therefore are representative of gamut limitations.

5. The method of claim 4, wherein the series of color values is representative of all color values across the first digital image.

6. The method of claim 4, wherein said determining comprises:

counting occurrences of each color value of the series of color values in the first digital image, counting occurrences of each color value of the series of color values in the second digital image, and comparing the occurrences counted across the first digital image against the occurrences counted across the second digital image.

7. The method of claim 4, further comprising:

binning color values included in the first and second digital images by dividing the first color space into a series of bins that correspond to the series of color values.

8. The method of claim 7, wherein said determining comprises:

establishing a count for each bin of the series of bins by counting occurrences of each color value in the series of color values in the first digital image, establishing a count for each bin of the series of bins by counting occurrences of each color value in the series of color values in the second digital image, and comparing the counts established for the series of bins for the first digital image against the counts established for the series of bins for the second digital image.

9. A method for identifying whether a printer will experience gamut limitations when printing a first digital image in a first color space, the method comprising:

transforming (i) the first color space to a second color space using a first International Color Consortium profile that characterizes the second color space and then (ii) the second color space to the first color space using a second International Color Consortium profile that characterizes the first color space, so as to produce a second digital image that is also in the first color space; and determining whether the printer will experience a gamut limitation by— comparing color content of the first digital image to color content of the second digital image, and identifying, based on an outcome of said comparing, colors, if any, that are in the first digital image but not the second digital image, and therefore are representative of gamut limitations.

10. The method of claim 9, wherein said determining comprises:

counting occurrences of each color value of a series of color values in the first digital image, counting occurrences of each color value of the series of color values in the second digital image, and comparing the occurrences counted across the first digital image against the occurrences counted across the second digital image.

11. The method of claim 9, wherein the first International Color Consortium profile characterizes the second color space according to standards promulgated by the International Color Consortium, and wherein the second International Color Consortium profile characterizes the first color space according to the standards promulgated by the International Color Consortium.

12. The method of claim 9, wherein the first color space is a Red-Green-Blue (RGB) color space, and wherein the second color space is a Cyan-Magenta-Yellow-Black (CMYK) color space.

13. The method of claim 12, wherein the second color space is a CMYK Orange Green (CMYKOG) color space, a CMYK Orange Green Violet (CMYKOGV) color space, a CMYK Red (CMYKR) color space, a CMYK Red Green Blue (CMYKRGB) color space, or a CMYK Green Blue (CMYKGB) color space.

* * * * *